(12) United States Patent
Bono

(10) Patent No.: US 7,206,795 B2
(45) Date of Patent: Apr. 17, 2007

(54) PREFETCHING AND MULTITHREADING FOR IMPROVED FILE READ PERFORMANCE

(76) Inventor: Jean-Pierre Bono, 33 Wachusett View Dr., Westboro, MA (US) 01581

( * ) Notice: Subject to any disclaimer, the term of this patent is extended or adjusted under 35 U.S.C. 154(b) by 541 days.

(21) Appl. No.: 10/744,536

(22) Filed: Dec. 22, 2003

(65) Prior Publication Data

US 2005/0138091 A1    Jun. 23, 2005

(51) Int. Cl.
*G06F 17/30* (2006.01)
(52) U.S. Cl. ...................... 707/203; 707/101
(58) Field of Classification Search ............ 707/1–10, 707/100–104.1, 200–206; 717/158; 718/100; 709/214
See application file for complete search history.

(56) References Cited

U.S. PATENT DOCUMENTS

| | | | | |
|---|---|---|---|---|
| 5,218,695 | A | 6/1993 | Noveck et al. ............ | 395/600 |
| 5,375,232 | A | 12/1994 | Legvold et al. ............ | 395/575 |
| 5,379,412 | A | 1/1995 | Eastridge et al. ........... | 395/575 |
| 5,737,747 | A | 4/1998 | Vishlitzky et al. ......... | 711/118 |
| 5,761,464 | A | 6/1998 | Hopkins ..................... | 395/310 |
| 5,829,046 | A | 10/1998 | Tzelnic et al. .............. | 711/162 |
| 5,835,953 | A | 11/1998 | Ohran ......................... | 711/162 |
| 5,887,151 | A | 3/1999 | Raz et al. .................... | 395/382 |
| 5,890,207 | A | 3/1999 | Sne et al. .................... | 711/113 |
| 5,890,219 | A | 3/1999 | Scarintella et al. ........ | 711/162 |
| 5,893,140 | A | 4/1999 | Vahalia et al. .............. | 711/118 |
| 6,035,375 | A | 3/2000 | Yanai et al. ................. | 711/129 |
| 6,076,148 | A | 6/2000 | Kedem ........................ | 711/162 |
| 6,223,204 | B1 | 4/2001 | Tucker ........................ | 709/103 |
| 6,269,390 | B1 | 7/2001 | Boland ........................ | 709/100 |
| 6,269,431 | B1 | 7/2001 | Dunham ..................... | 711/162 |
| 6,279,011 | B1 | 8/2001 | Muhlestein ................. | 707/204 |
| 6,289,369 | B1 | 9/2001 | Sundaresan ................ | 709/103 |
| 6,324,581 | B1 | 11/2001 | Xu et al. ..................... | 709/229 |
| 6,353,878 | B1 | 3/2002 | Dunham ..................... | 711/162 |
| 6,366,987 | B1 | 4/2002 | Tzelnic et al. .............. | 711/162 |
| 6,549,992 | B1 | 4/2003 | Armangau et al. ......... | 711/162 |
| 6,557,079 | B1 | 4/2003 | Mason, Jr. et al. ......... | 711/137 |
| 6,598,134 | B2 | 7/2003 | Ofek et al. .................. | 711/162 |
| 2003/0018691 | A1 | 1/2003 | Bono .......................... | 709/166 |
| 2004/0154011 | A1* | 8/2004 | Wang et al. ................ | 717/158 |
| 2004/0154012 | A1* | 8/2004 | Wang et al. ................ | 717/158 |

(Continued)

OTHER PUBLICATIONS

EMC Celerra SE5 File Server, EMC Corporation, Hopkinton, Mass. 01748-9103, 2002, 2 pages.

(Continued)

*Primary Examiner*—Diane D. Mizrahi
(74) *Attorney, Agent, or Firm*—Richard C. Auchterlonie; Novak Druce & Quigg, LLP

(57) ABSTRACT

A problem of latency during a read of a file is solved by activating multiple concurrent read threads and also by prefetching blocks of file data from storage to a file system cache. Prefetching ensures that by the time that a client or application needs more file data, the file data will already have been read from storage and written to the cache as a background operation. For example, a file server responds to a request to read an extent of file data consisting of eight consecutive file blocks by activating concurrent block read threads for reading the file blocks and by prefetching from the storage to the cache eight more consecutive blocks of data from the file.

46 Claims, 21 Drawing Sheets

U.S. PATENT DOCUMENTS

2005/0071438 A1* 3/2005 Liao et al. .................. 709/214
2005/0071841 A1* 3/2005 Hoflehner et al. .......... 718/100

OTHER PUBLICATIONS

"Celerra File Server in the E-Infostructure," EMC Corporation, Hopkinton, Mass., 2000, 9 pages.

EMC CLARiiON Backup Storage Solutions: Legato NetWorker in SAN Environments; A Joint Project of Legato Systems, Inc., and EMC; Engineering White Paper, EMC Corporation, 2002, pp. 2-21.

Raizen, Helen S. and Schwarm, Stephen C. Building a Semi-Loosely Coupled Multiprocessor System Based on Network Process Extension; Prime Computer, Inc. Framingham, MA, Jan. 29, 1991, pp. 1-17.

Morioka et al, "Design and Evaluation of the High Performance Multi-Processor Server," *IEEE International Conference on Computer Design: VLSI in Computers and Processors*; IEEE Computer Society Press, Los Alamitos, CA 1994, pp. 66-69.

"Intel Xeon Processor: Unparalleled Value and Flexibility for Small and Medium Business Server Applications," Intel Corporation, 2002, 4 pages.

"Intel Server Board SE7500WV2;" Intel Corporation, 2002, 6 pages.

"Building Cutting-Edge Server Applications: Intel Xeon Processor Family Features the Intel NetBurst Microarchitecture with Hyper-Threading Technology;" White Paper, Intel Corporation, 2002, 10 pages.

"Intel Pentium 4 and Intel Xeon Processor Optimization Reference Manual;" Intel Corporation 1999-2002, http://developer.intel.com. Tru64 UNIX Guide to DECthreads, Order No. AA—RH09RA—TE, Compaq Computer Corp., Houston, TX, Jul. 1999; Sep. 30, 2003.

"What is UNIX®—UNIX® System Threads Reference;" *Threads Reference Summary* ; http://www.unix-systems.org/version2/whatsnew/threadsref.html; printed Sep. 30, 2003, 16 pages.

Threads and the Single UNIX® Specification, Version 2—Extracted from Go Solo 2; *The Open Group*, 1997, 32 pages.

"POSIX Threads Test Suite;" VSTH Overview, *The Open Group*; http://www.opengroup.org/testing/testsuites/vsthover.htm;printed Sep. 30, 2003, 6 pages.

"IEEE Std. 1003.1, 1996 Edition—Description" http://standards.ieee.org/rreading/ieee/std_public/description/posix/9945-1-1996_desc.html. Printed Sep. 30, 2003, 4 pages.

Tape Backup; http://stweb.peel.edu.on.ca/pcsweb/Pc_tut/15tape.htm and /15tape2.htm, printed Sep. 26, 2003, 13 pages.

Linux Programmer's Manual, READV(2), Linux 2.2.0-pre8, Jan. 20, 1999, one page.

Tim Jones; Guru Guidance, Linux Backup Primer; Linux Magazine, Jul. 1999 http://www.linux-mag.com/1990-07/guru_01.html; printed Sep. 26, 2003, 9 pages.

Danny Kalev; Linux Tips and Tricks "Scatter/Gather I/O;" ITWorld.com; http://www.itworld.com/nl/lnx_tp/06142002/pf_index.html; printed Sep. 25, 2003, 2 pages.

Douglas Gilbert; The Linux SCSI Generic (sg) HOWTO, 2002; http://www.torque.net/sg/p/sg_v3_ho.html; printed Sep. 25, 2003, 41 pages.

Ligon III, W.B. and Ross, R.B.; "Implementation and Performance of a Parallel File System for High Performance Distributed Applications;" *Parallel Architecture Research Lab*, Clemson University, 1996; http://www.parl.clemson.edu/pvfs/hpdc96/hpdc96.html; printed Sep. 25, 2003, 13 pages.

"The Linux SCSI Generic (sg) Driver;" http://www.torque.net/sg/, printed Sep. 25, 2003, 5 pages.

* cited by examiner

PREFETCHING AND MULTITHREADING FOR IMPROVED FILE READ PERFORMANCE

BACKGROUND OF THE INVENTION

1. Field of the Invention

The present invention relates generally to data processing networks, and more particularly to data storage systems and file servers. The present invention relates specifically to reading data from a file in a file server.

2. Description of Related Art

A file server typically includes data storage for storing a file system, and a file system cache memory. File data is organized into data blocks having a certain size, such as 8 kilobytes. In response to a request to read an extent of file data, the file server sequentially reads each block of file data encompassed by the extent. The file server checks whether each such block of file data presently resides in the file system cache memory. If so, the file server obtains the block of file data from the cache memory. If not, the file server fetches the block of file data from the file system in the data storage, and writes the data block into the cache memory.

Multithreaded programming has been used for a variety of applications. In general, a thread is a single, sequential flow of control within a process. Within each thread there is a single point of execution. Each thread has it own set of register values. Therefore, each thread is a single instance of a program routine. A single processor can execute no more than one thread at any given time, but the processor may suspend execution of one thread to begin execution of another thread. The operating system can schedule execution of a thread, suspend execution of a thread, resume execution of a thread, and terminate execution of a thread. The operating system can schedule the execution of threads on a priority basis, and threads of the same priority can be executed on a time-share basis. In this fashion, a multithreaded program can perform computations while waiting for completion of a read or write to disk or while waiting for receipt of a packet from a data network.

There are various standards and software tools to help a programmer writing a multithreaded program. For example, IEEE Std 1003.1—1996 includes a Threads Extension for the Portable Operating Systems Interface (POSIX®) to open systems. This Threads Extension, called POSIX1c, has been included in the Single UNIX Specification, Version 2, as described in "Threads and the Single Unix ® Specification," Version 2, May 1997, by The Open Group, 8 New England Executive Park, Suite 325 Burlington Mass. 01803-5007, opengroup.org, and in the "Unix® Systems Threads Reference," also by the Open Group. Another implementation of the IEEE® POSIX® standard is described in "Tru64 UNIX Guide to DECthreads," July 1999, by the Compaq division of Hewlett-Packard, hp.com.

SUMMARY OF THE INVENTION

In accordance with one aspect, the invention provides method of responding to a request for reading an extent of data from a file in a file server. The file server has a cache memory and storage containing the file. The extent of data spans a first series of multiple blocks of file data. The file also spans a second series of multiple blocks of file data following the first series of multiple blocks of file data. The method includes activating a respective read thread for reading each of the multiple blocks of file data in the first series of multiple blocks of file data so that the read threads are concurrently reading the multiple blocks of file data in the first series of multiple blocks of file data. The method further includes prefetching the second series of multiple blocks of file data by reading from the storage and writing to the cache memory each block of file data in the second series of multiple blocks of file data that is not found in the cache memory.

In accordance with another aspect, the invention provides a method of responding to a request for reading an extent of data from a file in a file server. The file server has a cache memory and storage containing the file. The extent of data spans a first series of multiple blocks of file data, and the file also spans a second series of multiple blocks of file data following the first series of multiple blocks of file data. The method includes executing a main thread for responding to the request for reading the extent of data from the file. The main thread activates block read threads for reading at least some of the blocks of file data in the first series of multiple blocks of file data so that the block read threads are concurrently reading at least some of the blocks of file data in the first series of multiple blocks of file data, and then the main thread activates a prefetch thread for prefetching the second series of multiple blocks of file data by reading from the storage and writing to the cache memory each block of file data in the second series of multiple blocks of file data that is not found in the cache memory. Then the main thread is suspended, and then the main thread is activated once the block read threads have finished reading the blocks of file data in the first series of multiple blocks of file data.

In accordance with yet another aspect, the invention provides a method of responding to a request for reading an extent of data from a file in a file server. The extent of data includes a first series of multiple blocks of file data. The file also includes a second series of multiple blocks of file data immediately following the first series of multiple blocks of file data. The file server has a file system cache memory and storage containing the file. The method includes activating concurrent read operations, each of the concurrent read operations reading a respective one of the multiple blocks of file data, and prefetching from the storage to the file system cache memory the second series of multiple blocks of file data immediately following the first series of multiple blocks of file data.

In accordance with still another aspect, the invention provides a file server including a cache memory and storage containing a file. The file server is programmed for responding to a request for reading an extent of data from the file. The extent of data spans a first series of multiple blocks of file data. The file also spans a second series of multiple blocks of file data following the first series of multiple blocks of file data. The file server is programmed for responding to the request for reading the extent of data from the file by activating a respective read thread for reading each of the multiple blocks of file data in the first series of multiple blocks of file data so that the read threads are concurrently reading the multiple blocks of file data in the first series of multiple blocks of file data, and by prefetching the second series of multiple blocks of file data by reading from the storage and writing to the cache memory each block of file data in the second series of multiple blocks of file data that is not found in the cache memory.

In accordance with yet still another aspect, the invention provides a file server comprising a cache memory and storage containing a file. The file server is programmed for responding to a request for reading an extent of data from the file by executing a main thread. The extent of data spans a first series of multiple blocks of file data, and the file also spans a second series of multiple blocks of file data following the first series of multiple blocks of file data. The main thread is programmed for activating block read threads for reading at least some of the blocks of file data in the first series of multiple blocks of file data so that the block read threads are concurrently reading at least some of the blocks of file data in the first series of multiple blocks of file data, and then activating a prefetch thread for prefetching the second series of multiple blocks of file data by reading from the storage and writing to the cache memory each block of file data in the second series of multiple blocks of file data that is not found in the cache memory, and then suspending the main thread, and then activating the main thread once the block read threads have finished reading the number of blocks of file data in the first series of multiple blocks of file data.

In accordance with a final aspect, the invention provides a file server including a file system cache memory and storage containing a file. The file server is programmed for responding to a request for reading an extent of data from the file, the extent of data including a first series of multiple blocks of file data. The file server is programmed for responding to the request for reading the extent of data from the file by activating concurrent read operations, each of the concurrent read operations reading a respective one of the multiple blocks of file data, and prefetching from the storage to the cache memory a second series of multiple blocks of file data immediately following the first series of multiple blocks of file data.

BRIEF DESCRIPTION OF THE DRAWINGS

Other objects and advantages of the invention will become apparent upon reading the detailed description with reference to the drawings, in which.

Figure 1:
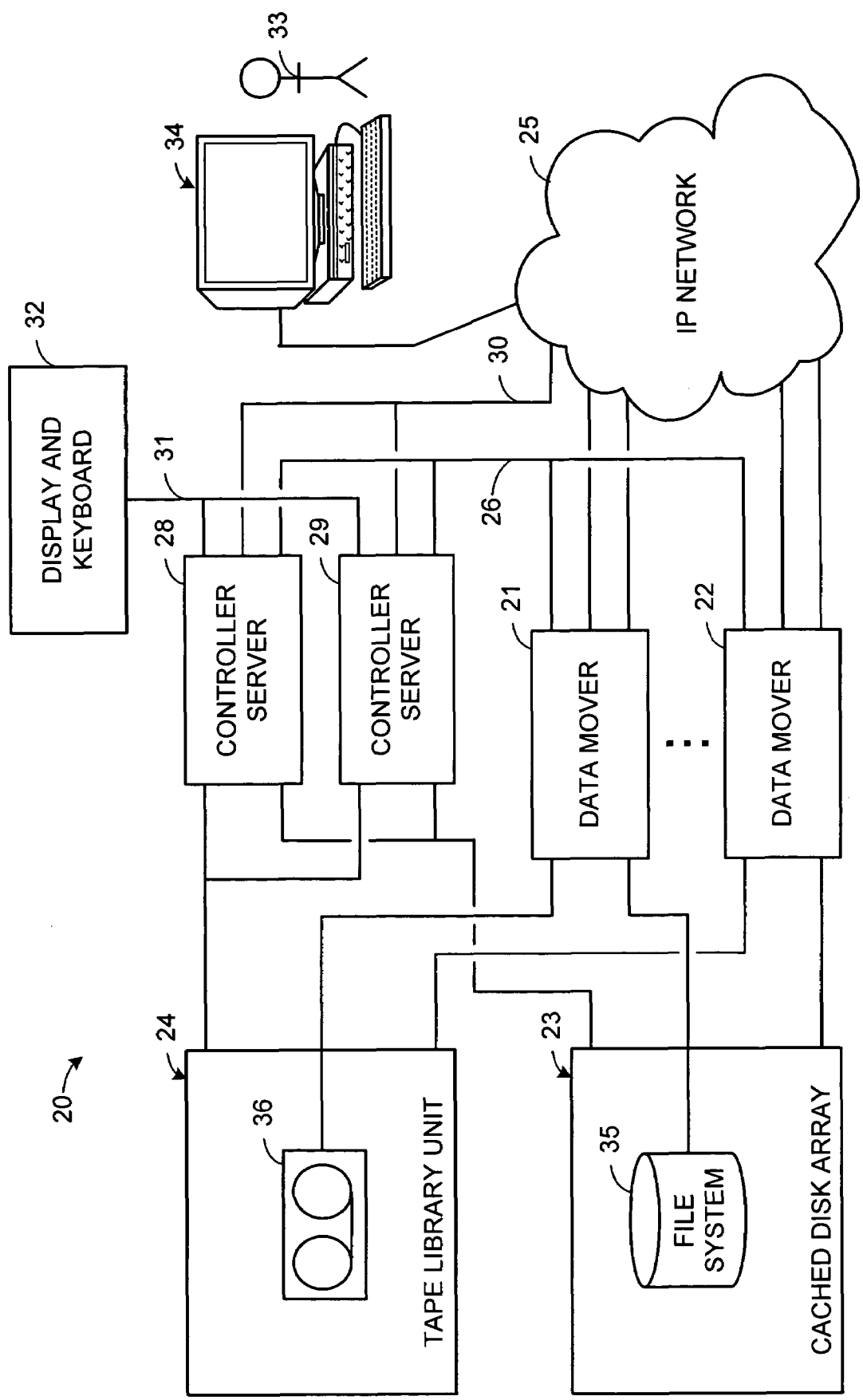
FIG. 1 is a block diagram of a network file server.

While the invention is susceptible to various modifications and alternative forms, specific embodiments thereof have been shown by way of example in the drawings and will be described in detail. It should be understood, however, that it is not intended to limit the form of the invention to the particular forms shown, but on the contrary, the intention is to cover all modifications, equivalents, and alternatives falling within the scope of the invention as defined by the appended claims.

DESCRIPTION OF ILLUSTRATIVE EMBODIMENTS

FIG. 1 shows a network file server 20 including multiple data mover computers 21, 22 for moving data between a cached disk array 23, a tape library unit 24, and an IP network 25. The network file server 20 also has dual redundant controller servers 28, 29 connected via a dedicated dual-redundant data link 26 among the data movers. The controller servers 28, 29 also share a link to a display and keyboard 32 for configuring the data movers 21, 22 and the cached disk array 23. The controller servers 28, 29 also share a link 30 to the IP network 25 permitting a system administrator 33 at a workstation 34 to monitor, configure, and control the network file server 20. For example, the system administrator 33 can schedule backup of selected files in a file system 35 in the cached disk array 23 to a tape cartridge 36 in the tape library unit 24.

Further details regarding the network file server 20 are found in Vahalia et al., U.S. Pat. No. 5,893,140, issued Apr. 6, 1999, incorporated herein by reference, and Xu et al., U.S. Pat. No. 6,324,581, issued Nov. 27, 2001, incorporated herein by reference. The network file server 20 is managed as a dedicated network appliance, integrated with popular network operating systems in a way, which, other than its superior performance, is transparent to the end user. The clustering of the data movers 21, 22 as a front end to the cached disk array 23 provides parallelism and scalability.

Each of the data movers 21, 22, is a high-end commodity computer, providing the highest performance appropriate for a data mover at the lowest cost. The data mover computers 21, 22 may communicate with other network devices using standard file access protocols such as the Network File System (NFS) or the Common Internet File System (CIFS) protocols, but the data mover computers do not necessarily employ standard operating systems. For example, the network file server 21 is programmed with a Unix-based file system that has been adapted for rapid file access and streaming of data between the cached disk array 29 and the data network 20 by any one of the data mover computers 26, 27, 28.

Figure 2:
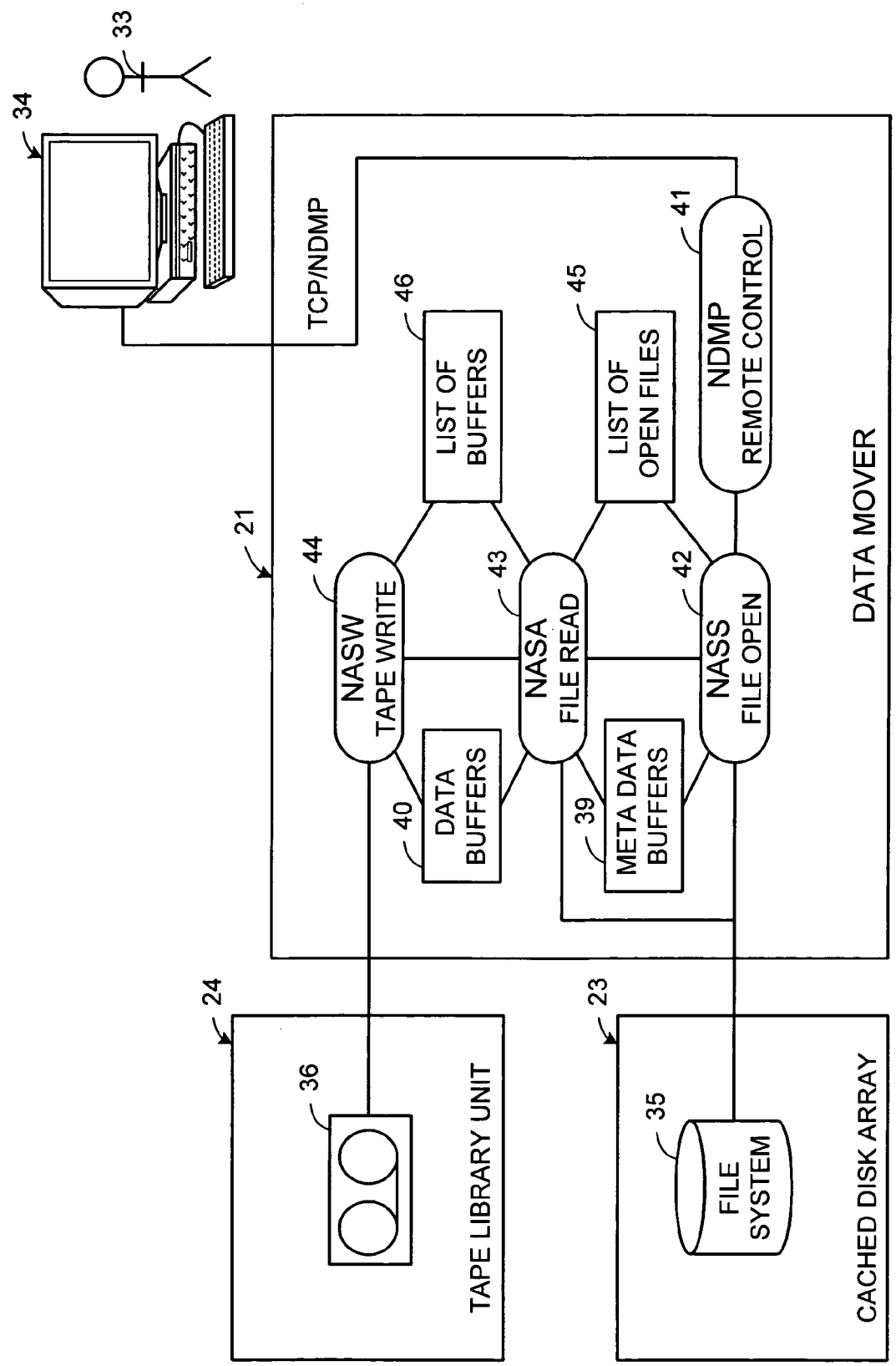
FIG. 2 is a block diagram showing "prior art" backup software that has been used in the network file server of FIG. 1.

FIG. 2 shows backup software that has been used in the network file server of FIG. 1. In general, selected files of the file system 35 in storage of the cached disk array 23 are backup up to the tape cartridge 36 in the tape library unit 24 by reading data from each selected file from the file system 35 to data buffers 40 in the data mover 21, and then writing the data for the file from the data buffers 40 to the tape cartridge 36 in the tape library unit 24.

The backup software in the data mover 21 further includes a Network Data Management Protocol (NDMP) remote control interface routine 41 and three working threads for backing up files from disk to tape. These threads include a thread 42 called "NASS" for opening files, a thread 43 called "NASA" for reading data from open files, and a thread 44 called "NASW" for writing the data to tape.

The NDMP routine 41 receives a request to back up selected files in a specified file system 35. The NDMP routine 41 ensures that a tape cartridge 36 is mounted in a tape drive of the tape library unit 24 for receiving backup data from the selected files of the file system 35. The tape drive, for example, is a Small Computer System Interface (SCSI) device, and a device file is opened for the tape drive, causing a file descriptor to be associated with the tape drive. The NDMP routine 41 then invokes the NASS thread 42.

The NASS thread 42 traverses the file system 35 to determine the files that need to be backed up. The NASS thread 42 reads attributes for each file from the file system directory containing the file. If the file attributes indicate that the file should be backed up, then NASS 42 opens the file, places a file descriptor for the file in a list 45 of open files, and puts some file attributes including the file name into one of the meta data buffers 39. For example, for a "full" backup, a file should be backed up if it has an "archive" attribute set, and for an "incremental" backup, a file should be backed up if it has its "archive" attribute set and if its "last modified time" attribute is more recent than the time of the last backup of the file system. The file attributes in the meta data buffer will be written to the tape cartridge 36 as a header to the data of the file. The list 45 of open files functions as a pipeline queue for file reading tasks requested by the NASS thread 42 and performed by the NASA thread 43.

The NASA thread 43 works on any open files in the list 45. The NASA thread 43 reads data from each open file from the file system 35 into the data buffers 40. Once data have been written to one of the data buffers 40, a descriptor of the data buffer is added to a list of buffers 46. The descriptor, for example, includes a starting address of data in the buffer and a length of bytes written into the buffer. The list of buffers 46 functions as a pipeline queue for tape writing tasks requested by the NASA thread 43 and performed by the NASW thread 44.

When a backup starts, the NASA thread 43 puts sixty-four buffers into the pool of meta data buffers 39. Then the NASA thread 43 waits for NASS thread to fill the meta data buffers 39. The NASS thread 42 traverses the backup file system, fills meta data to the meta data buffers, and puts them back into the meta buffer pool 39. Upon getting a meta data buffer, the NASA thread writes file header structure, reads file data, and buffers the file data to the write block size. To keep the tape drive streaming, the NASA thread 43 holds the data buffers 40 until thirty data buffers are filled, and then releases the first data buffer to the data buffer pool 40. Then it releases the rest of the data buffer pool 40 immediately afterwards. Once the NASA thread 43 releases a data buffer, it can be accessed by the NASW thread 44 for writing data of the data buffer to the tape cartridge 36.

For each buffer in the list of buffers 46, the NASW thread 44 writes the data from the buffer to the tape cartridge 36. In a single write request to the tape library unit 24, for example, the NASW thread can specify up to 64 kilobytes of data to be written to the tape cartridge. Each write request can specify multiple buffers so that a scatter-gather operation is performed with respect to buffers that may contain much less than 64 kilobytes of data. For example, the NASW thread 44 calls a vector write function of the operating system to write the data from the buffers 40 to the tape cartridge 36. The vector write function has the following format:

```
int writev(int fd, const struct iovec * vector, int count)
where iovec has the following format:
struct iovec {
    __ptr_t iov_base; /* Starting address. */
    size_t iov_len; /* Length in bytes. */
};
```

The vector write function (writev) writes data to the file descriptor fd, and from the buffers described by vector. The number of buffers is specified by count. The buffers are used in the order specified. The vector write function is an atomic operation. In other words, if a thread invokes the vector write function, then the vector write function will complete regardless of whether the thread is suspended during performance of the vector write function. The Linux operating system, for example, provides such a vector write function.

Figure 3:
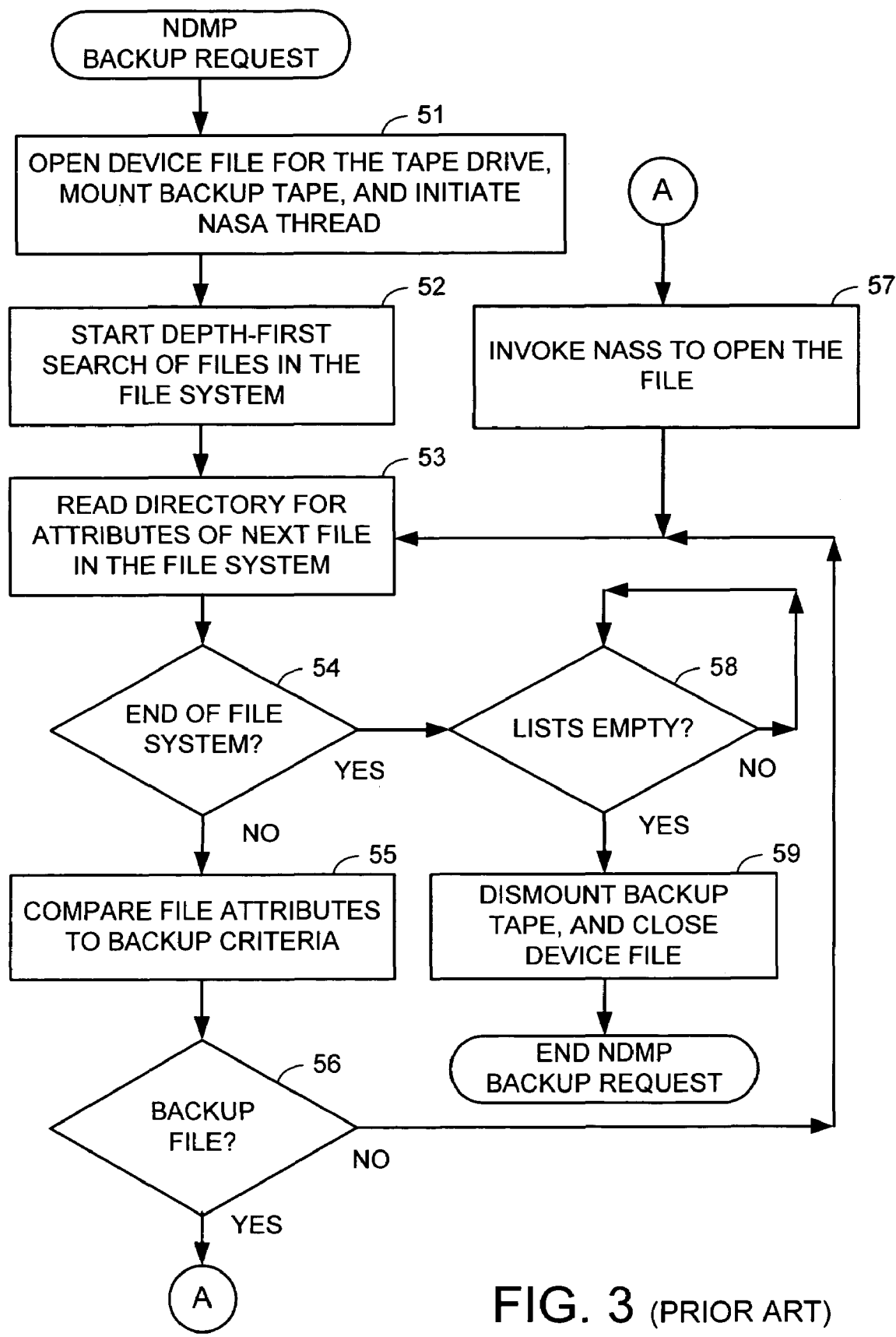
FIG. 3 is a flowchart of a Network Data Management Protocol (NDMP) thread used in FIG. 2 for responding to a backup request from a system administrator.

FIG. 3 shows a flowchart of an NDMP routine for responding to a request for backup of a specified file system. In a first step 51, the NDMP routine opens a device file for a tape drive in the tape library unit, mounts a tape cartridge in the tape drive, and initiates a NASA thread as further described below with reference to FIGS. 5–6. Then in step 52, the NDMP routine starts a top-down, depth-first search for files in the specified file system. This causes a certain ordering of the files that is expected when backup is performed in response to a Unix "tar" command. In step 53, in accordance with the search, the NDMP routine reads a directory in the file system to obtain attributes of the next file found in the file system. In step 54, unless the end of the file system has been reached, execution continues to step 55. In step 55, the file attributes are compared to backup criteria. In step 56, if the file attributes indicate that the file should be backed up, then execution continues to step 57 to invoke the NASS routine to open the file. Once the file is opened, execution loops back to step 53. Execution also loops back to step 53 from step 56 if the file attributes indicate that the file should not be backed up. Eventually the end of the file system is reached in step 54, so that execution continues from step 54 to step 58. In step 58, the NDMP routine waits until the list of open files, the list of buffers, and a vector of data to be written to tape have become empty. Then in step 59, the NDMP routine dismounts the tape cartridge and closes the device file for the tape drive, and the NDMP routine is finished.

Figure 4:
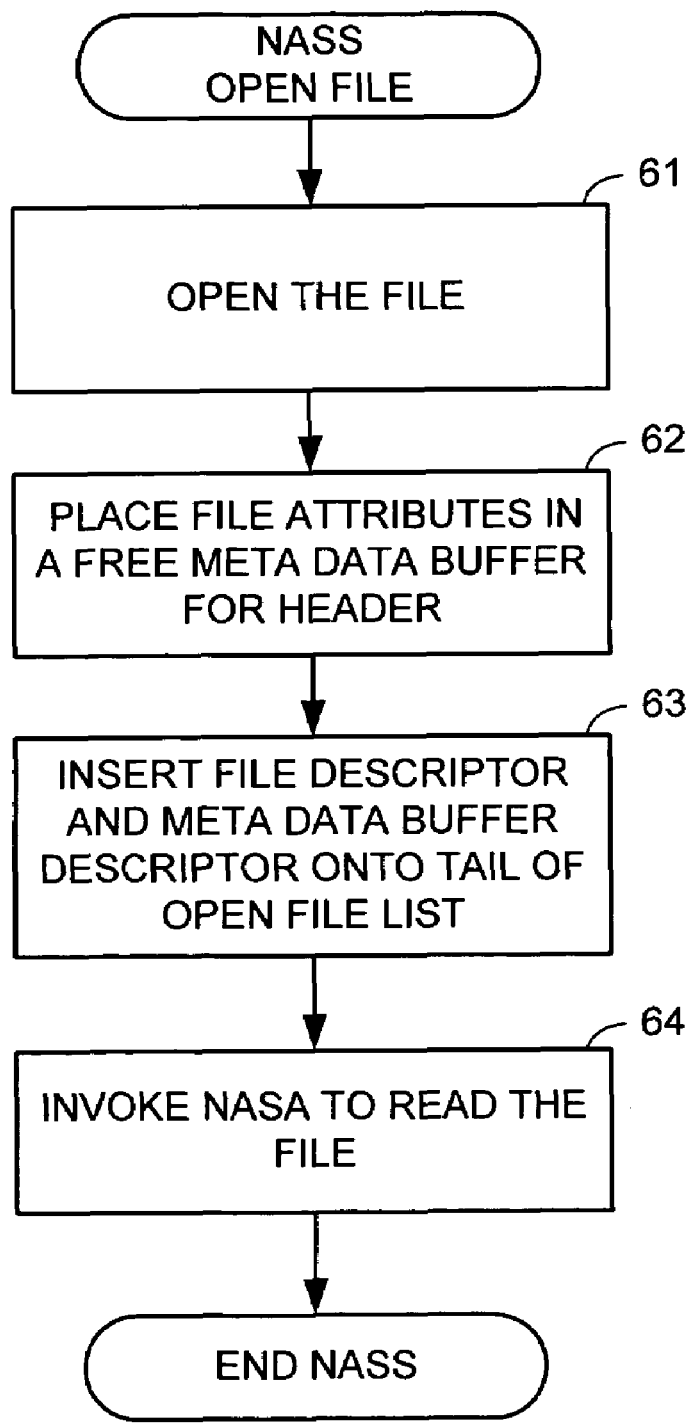
FIG. 4 is a flowchart of a thread used in FIG. 2 for opening a file.

FIG. 4 shows the NASS thread for opening a file specified by the NDMP routine. In a first step 61, the NASS thread opens the file. In step 62, the NASS thread places the file attributes (from step 53 in FIG. 3) into a free buffer for the header to be written to the backup tape. In step 63, the NASS thread inserts a file descriptor for the opened file and a buffer descriptor for the header into the tail of the open file list. Finally, in step 64, the NASS thread invokes the NASA thread to read the file, and the NASS thread is finished.

Figure 5:
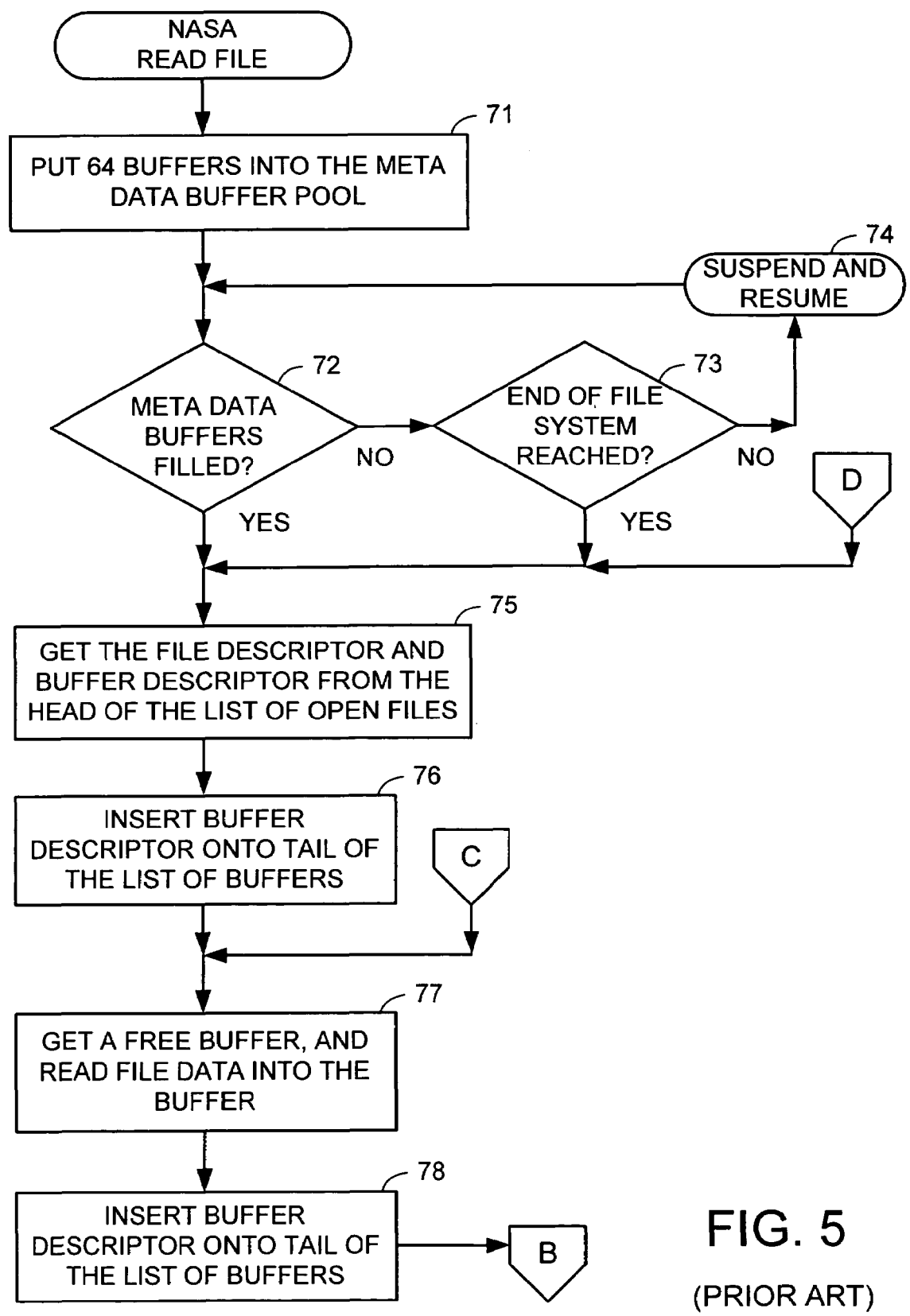
FIGS. 5–6 comprise a flowchart of a thread used in FIG. 2 for reading a file.

FIG. 5 shows a flowchart of the NASA thread. In a first step 71, the NASA thread puts sixty-four buffers into the meta data buffer pool. Then the NASA thread waits until either the NASS thread fills these buffers in step 72 or until the end of the file system is reached in step 73. This is done so that the tape drive is not started until a good number of the files have been opened, in order to avoid discontinuous operation of the tape drive. In particular, execution branches from step 72 to step 73 if the meta data buffers are not filled, and from step 73 to step 74 if the end of the file system has not been reached. In step 74, the NASA thread is placed in a wait state until a meta data buffer has been filled or until the end of the file system has been reached. Once the meta data buffers have been filled or the end of the file system has been reached, execution continues from step 72 or step 73, respectively, to step 75.

In step 75, the NASA thread gets the file descriptor and the buffer descriptor from the head of the list of open files. Next, in step 76, the NASA thread inserts the buffer descriptor onto the tail of the list of buffers. In step 76, the NASA thread may also write additional information into this metadata buffer, in case the file header for the tape format includes more information than the metadata read from the directory entry for the file in the file system. In step 77, a free buffer is obtained, and file data are read into the buffer. In step 78, a descriptor for this buffer is inserted onto the tail of the list of buffers. Execution continues from step 78 of FIG. 5 to step 79 in FIG. 6.

Figure 6:
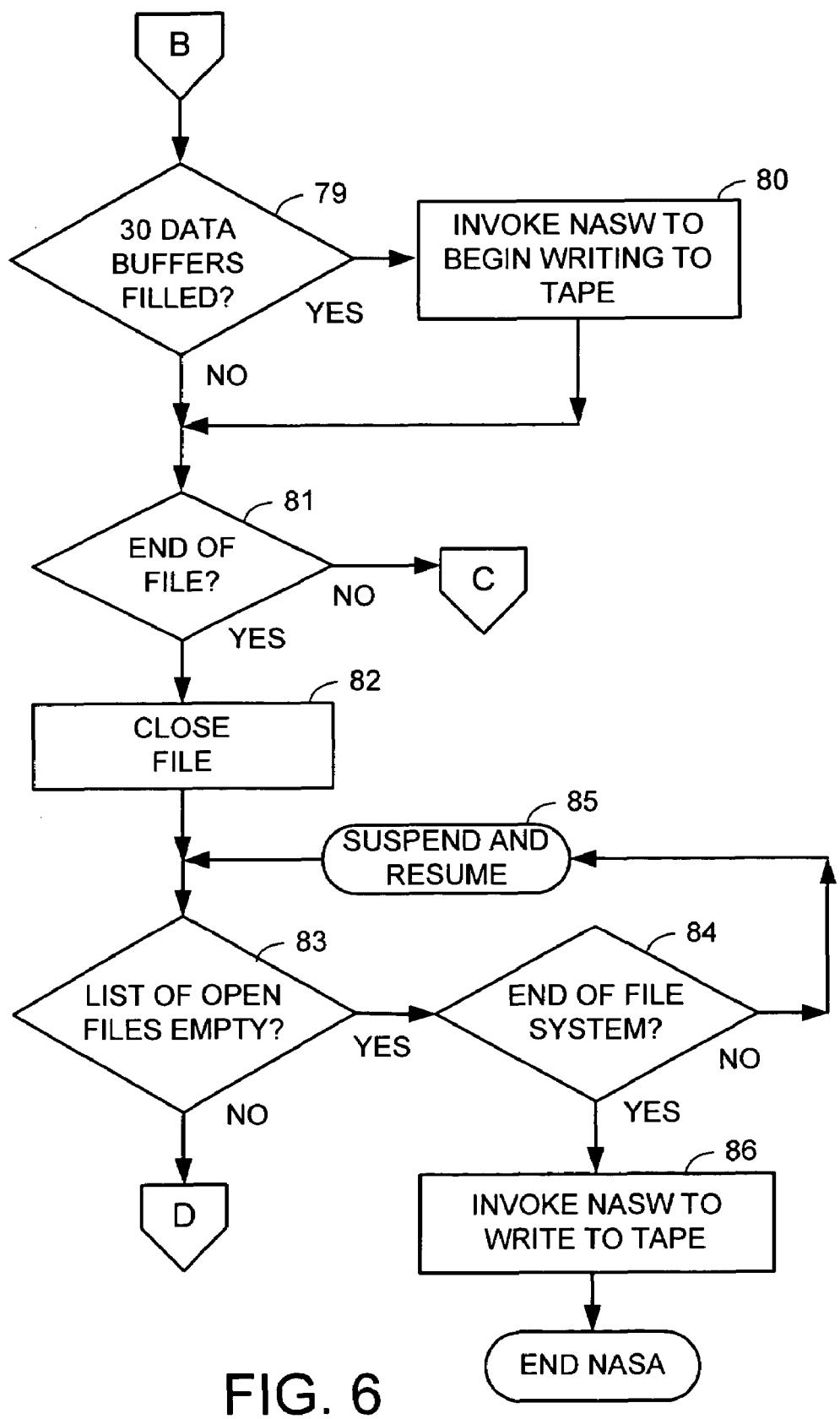

In step 79 of FIG. 6, if thirty buffers have been filled, then execution branches to step 80 to activate the NASW thread to begin writing to tape. The tape drive is not started until a good number of the data buffers have been filled, in order to avoid discontinuous operation of the tape drive. Execution continues from step 79 or step 80 to step 81. In step 81, if the end of the file has not been reached, then execution loops back to step 77 of FIG. 5, in order to read additional data from the file. Once the end of the file has been reached, execution continues to step 82 to close the file. Execution continues from step 82 to step 83.

In step 83, if the list of open files is not empty, then execution loops back to step 75 of FIG. 5 to read data from the next file on the list of open files. Otherwise, execution branches from step 83 to step 84. In step 84, if the end of the file system has not been reached, then in step 85 the NASA thread is suspended and remains in a wait state until the NASS thread opens another file or until the NDMP routine indicates that the end of the file system has been reached and there are no more files to be opened. Then the NASA thread resumes and execution loops back from step 85 to step 83.

Once the end of the file system has been reached and there are no more files to be opened, execution continues from step 84 to step 86 to invoke the NASA thread to write to tape, in case step 80 was never reached because 30 data buffers were never filled. Then the NASA thread terminates.

Figure 7:
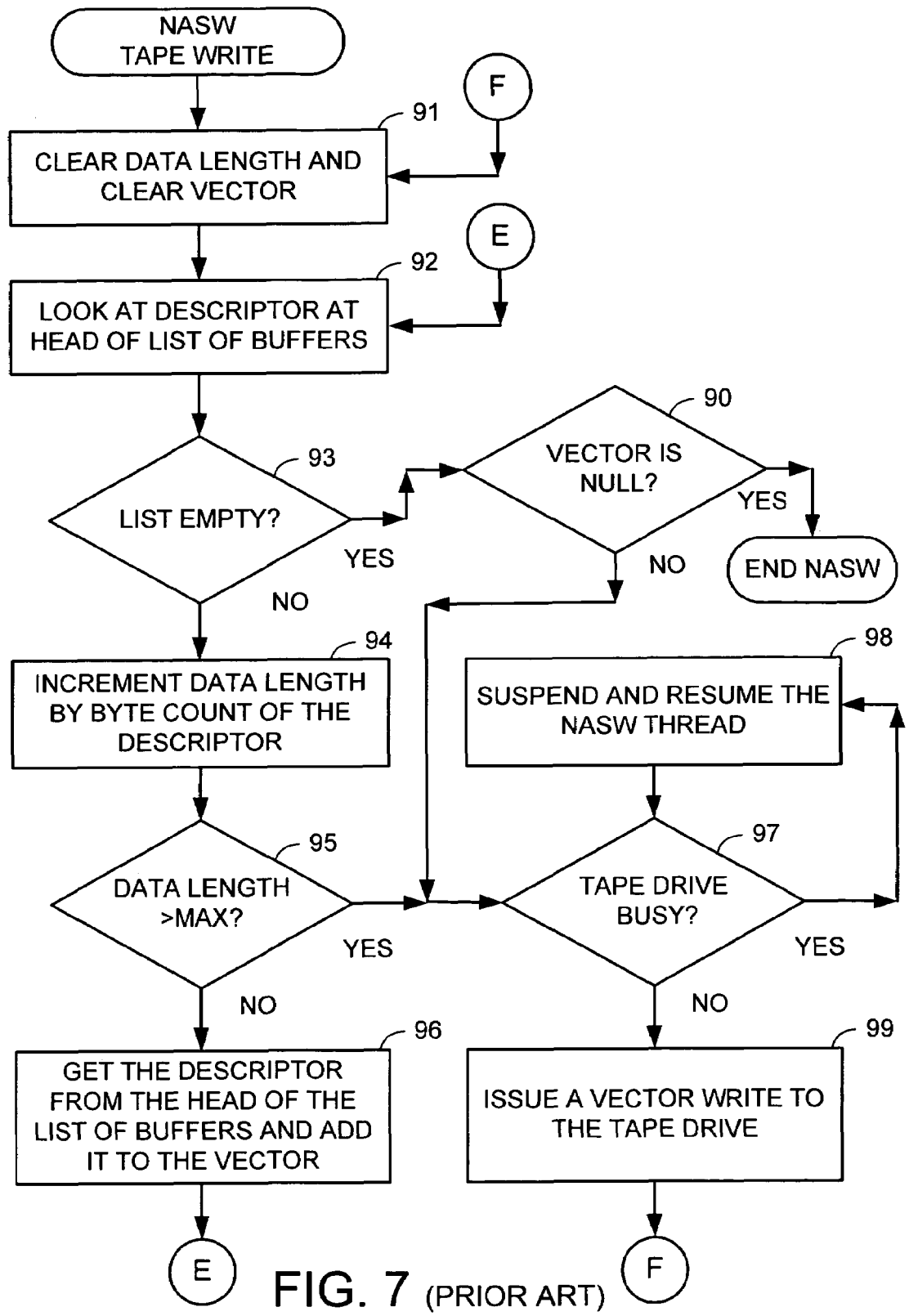
FIG. 7 is a flowchart of a thread used in FIG. 2 for writing to tape.

FIG. 7 shows the NASW thread. The NASW thread assembles buffer descriptors from the list of buffers into a vector up to a maximum data length, and then issues the vector in a write request to the tape drive. This process is repeated until the list is empty and all data from all of the buffers have been written to the backup tape.

In a first step 91, the NASW thread clears a data length variable and clears a vector of buffer descriptors. Next, in step 92, the NASW thread looks at the buffer descriptor at the head of the list of buffers. In step 93, if the list of buffers is not empty, then execution continues to step 94. In step 94, the data length is incremented by the byte count of the buffer descriptor. In step 95, if the data length is not greater than a maximum limit, then execution continues to step 96. The maximum limit, for example, is 64 kilobytes. In step 96, the descriptor from the head of the list of buffers is removed and added to the vector. From step 96, execution loops back to step 92 to get a next descriptor from the list of buffers.

In step 95, if the data length would exceed the maximum limit, then execution branches from step 95 to step 97. In step 97, if the tape drive is busy, the NASW thread is suspended and resumed in step 98 until the tape drive is no longer busy, and execution continues to step 99. For example, the tape drive is busy when it has received two pending vector write requests. After step 99, execution loops back to step 91 to assemble another vector write request. Once the list of buffers has become empty in step 93 and the vector is null in step 90, the NASW thread is finished.

In the backup system of FIG. 2, a performance issue may arise with respect to backup of very small files. For example, a large number of small files are typically found in an E-mail folder. In this situation, the NASA thread can become a bottleneck.

Figure 8:
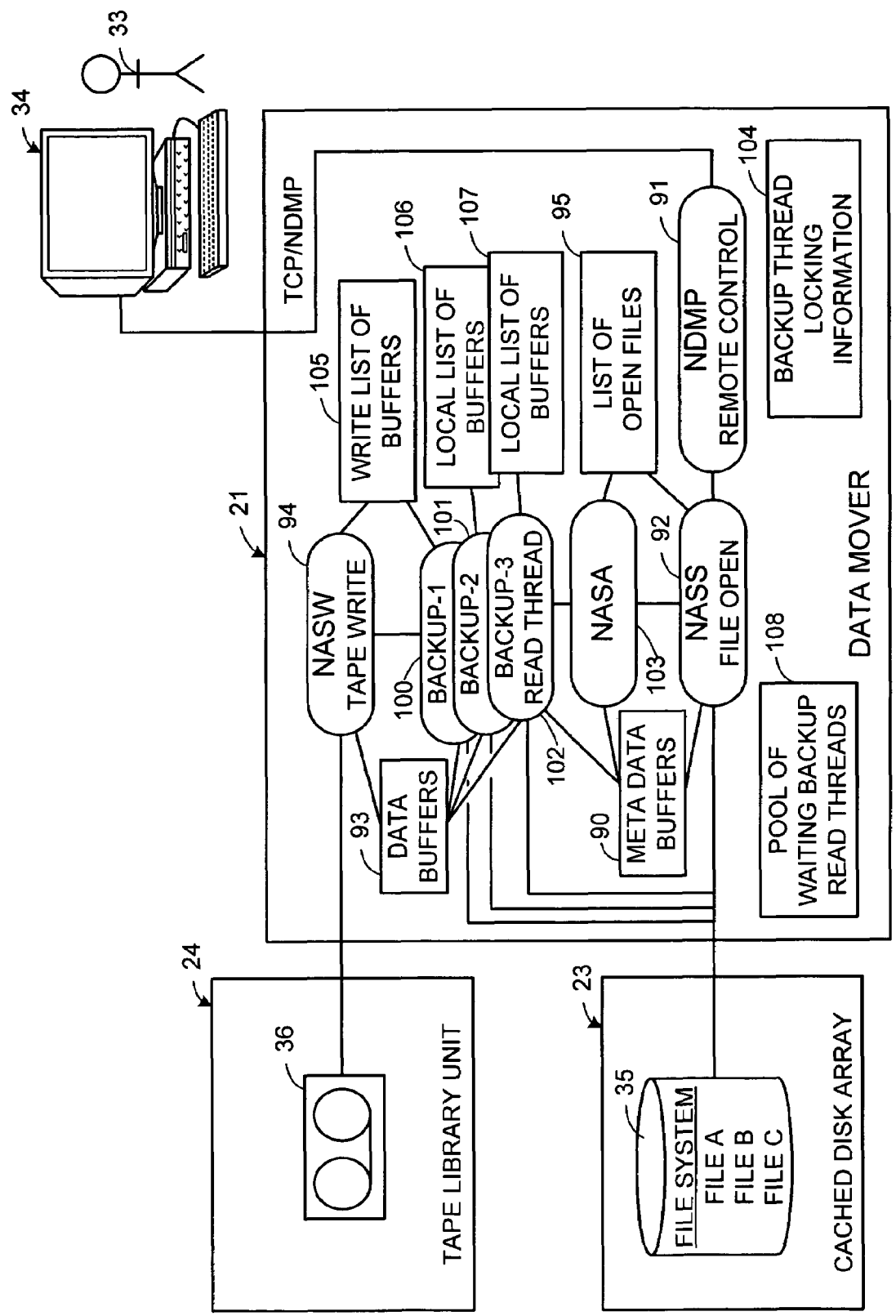
FIG. 8 shows an example of improved backup software.

As shown in FIG. 8, backup performance can be improved substantially by permitting a modified NASA thread 103 to initiating multiple concurrent backup threads 100, 101, 102 for reading respective files, and permitting each backup thread to pre-fetch file data from its respective file into a respective local data buffer pool defined by a respective local list of buffers 106, 107. The active backup threads are arranged in a queue so that the order in which file data are written to tape is the same as the order in which the files are opened by the NASS thread 92.

Each backup thread has its own unique process identifier (PID), its own local list of buffers 106, 107, and a corresponding file descriptor of a file to be read by the backup thread. Each file opened by the NASS thread has one associated backup thread that reads the file. When the pre-fetched data for a backup thread are ready to be written to tape, the backup thread links its local list of buffers into the write list of buffers 105.

At the start of the backup operation, the modified NASA thread 103 initiates a certain number (N) of backup threads, depending on the expected size of the files to be backed up. For example, the number (N) of backup threads is programmable and has a default value of sixteen. Preferably, the number (N) of backup threads is programmed to range from a minimum of sixteen for files of about 100 kilobytes or more to a maximum of ninety-two for files of about eight kilobytes or less.

Each backup thread waits for an open file to be backed up. When the backup thread is assigned an open file to be backed up, it prefetches a certain amount of data from the open file. Two variables, "nass_owner" and "nasw_owner", are used to keep the files backed up in the same order as the files are opened by the NASS thread. Nass_owner indicates the thread PID that has ownership of the list of open files 95 for the purpose of getting the meta data buffer of the next open file from the NASS thread 92. Nasw_owner indicates the thread PID that has ownership of the write list of buffers 105 for the purpose of passing a data buffer to the NASW thread 94.

Each backup thread waits for its PID to be indicated by nass_owner. Upon obtaining ownership of the NASS thread 92 and getting a next meta data buffer from the meta data buffer pool 90, the backup thread transfers ownership of the NASS thread to the next backup thread PID, links the meta data buffer into its local list of buffers, prefetchs up to a certain maximum number of data blocks from the file identified by metadata in the meta data buffer, waits for NASW ownership, finishes the reading of file data after getting the NASW ownership, and then transfers NASW ownership to the next backup thread PID.

The unique PID of each backup thread is assigned to the backup thread when the modified NASA thread 103 initiates the backup thread. Prior to initiation of the backup threads, the modified NASA thread 103 initially sets the NASS ownership and the NASW ownership to the first thread (i.e., PID=1).

In the example of FIG. 8, the NASS thread 92 had opened a file A, and had inserted a descriptor of the meta data buffer for file A onto the list of open files 95. Then the backup-1 thread 100 had used the descriptor for file A from the list of open files to get the meta data buffer for the file A and read data from file A into data buffers 93 on a local list of buffers that has become linked to the write list of buffers 105.

The NASS thread 92 had also opened a file B, and had inserted a descriptor of the metadata buffer for file B onto the list of open files 95. Then the backup-2 thread 101 obtained the descriptor of the meta data buffer for file B from the list of open files 95 to read data from file B into buffers 93 on a local list of buffers 106.

The NASS thread 92 had also opened a file C, and had inserted a descriptor of the meta data buffer for file C onto the list of open files 95. The backup-3 thread 102 had used the descriptor of the meta data buffer for file C from the list of open files 95 to read data from file C into the buffers 93 on a local list of buffers 107.

For efficient use of data mover buffer memory, there is a limit on the amount of file data that a backup thread 100, 101, 102 can prefetch into the data buffers 93 on its local list of buffers before it becomes the NASW owner. For example, each backup thread that is not the NASW owner can prefetch up to 128 kilobytes of file data.

Figure 9:
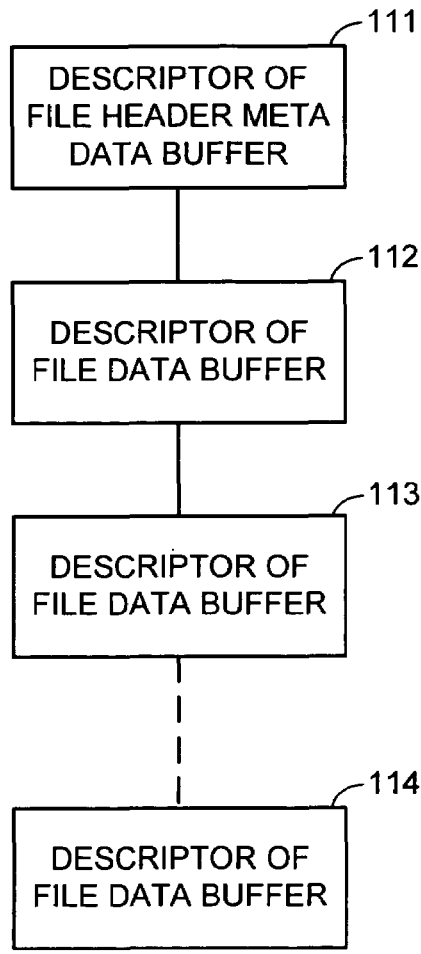
FIG. 9 shows the organization of a local list of buffers used in FIG. 7.

FIG. 9 shows the organization of a local list of buffers used in FIG. 7. The local list of buffers includes a descriptor 111 of the file header meta data buffer, and one or more descriptors 112, 113, 114 of file data buffers.

Figure 10:
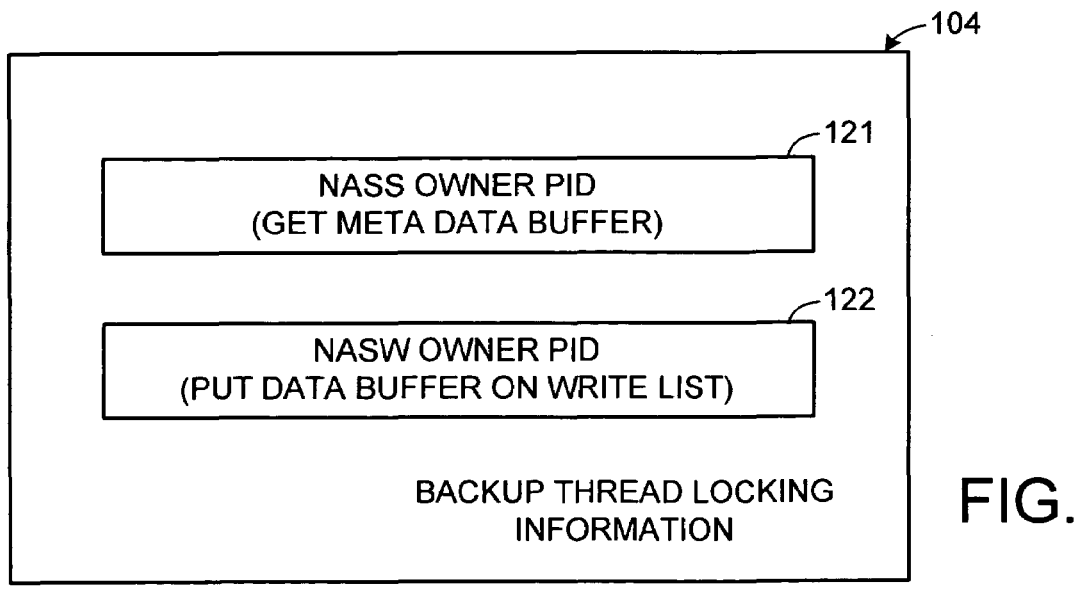
FIG. 10 shows thread locking information for maintaining a queue of multiple instances of a thread routine used in FIG. 7 for reading files.

FIG. 10 shows the locking information 104 for organizing the active backup threads into a queue. This information includes the NASS owner backup thread PID 121 and the NASW owner backup thread PID 122.

In general, the backup software in FIG. 7 is designed to use an NDMP backup routine 91, a NASS thread 92, and a NASW thread 94 that are similar to the NDMP backup routine 41, NASS thread 42, and NASW thread 44, respectively, that were used in the backup software of FIG. 2. The NASA thread 43 is modified so that multiple concurrent instances of a backup thread routine perform the file reading and buffer filling operations of the NASA thread 43.

Figure 11:
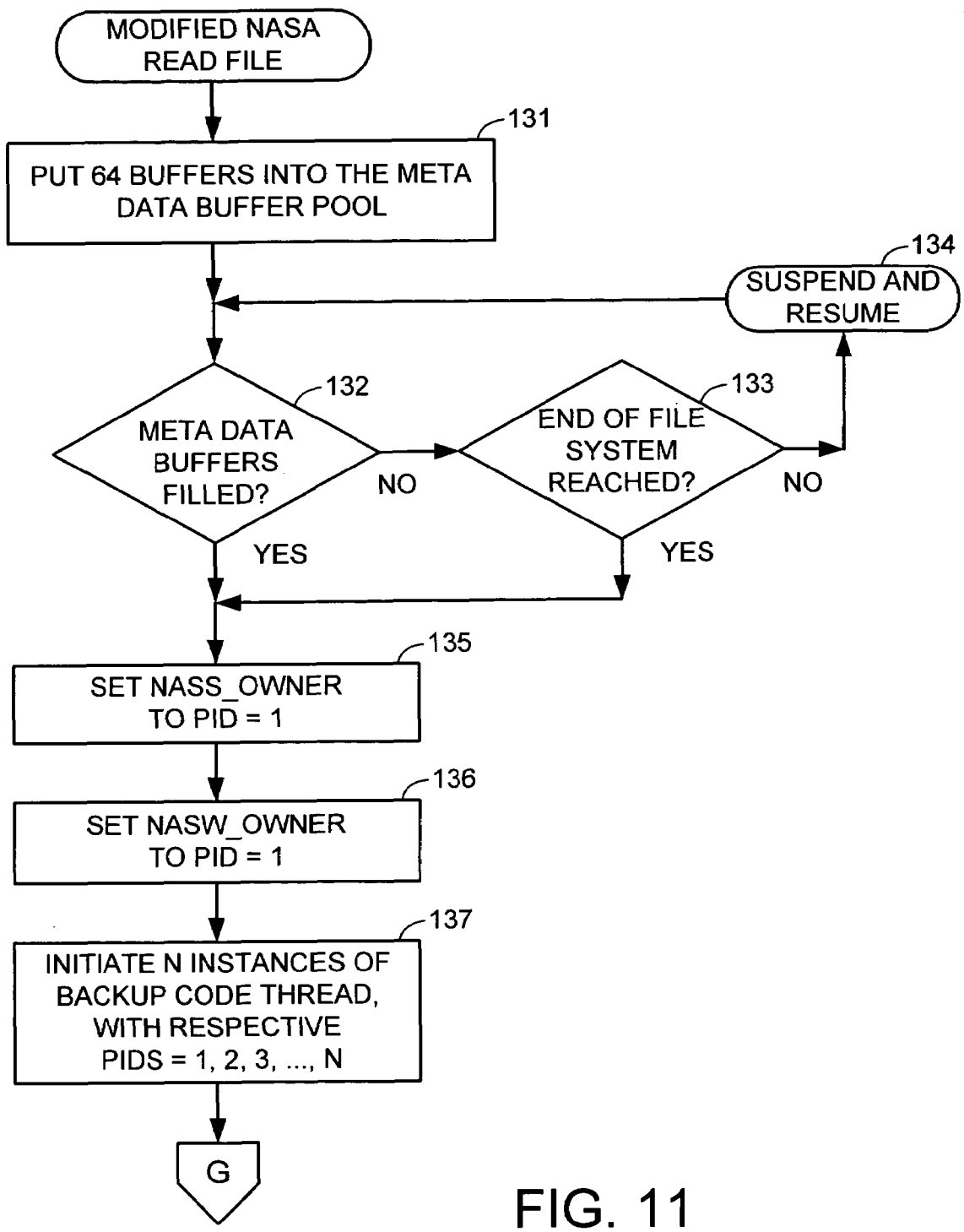
FIGS. 11–12 show a flowchart of a routine used in the backup software of FIG. 8 for creating multiple instances of a backup thread routine for reading files.
Figure 12:
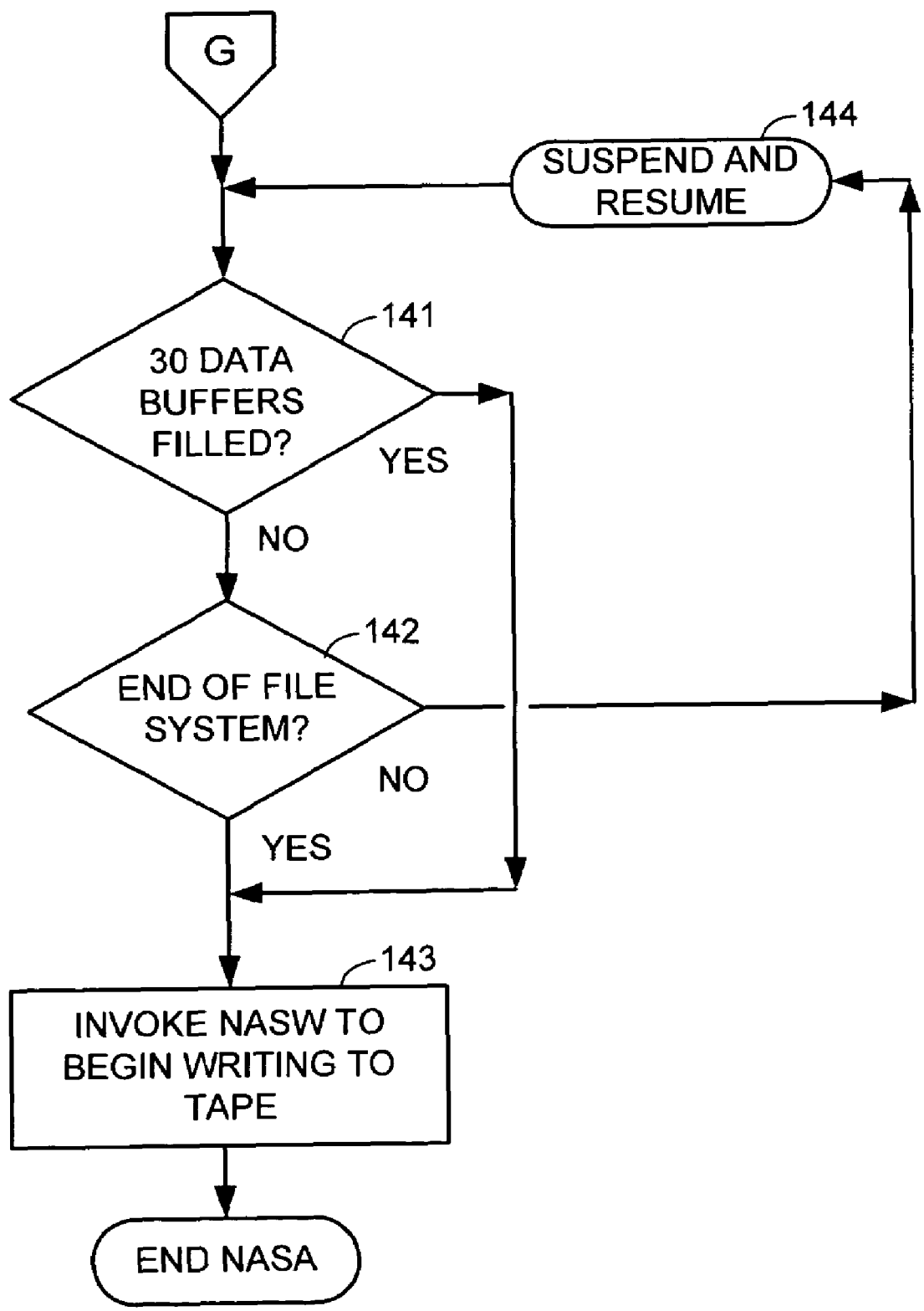

FIG. 11 shows a first sheet of a flowchart of the modified NASA thread 103 for the backup software of FIG. 8. Steps 131, 132, 133, and 134 are similar to steps 71 to 74 of FIG. 5. In step 135, the modified NASA thread sets the nass_owner to a PID value of 1. In step 136, the modified NASA thread sets the nasw_owner to a PID value of 1. In step 137, the modified NASA thread initiates the pre-programmed number (N) of instances of the backup code thread routine, with respective initial PID values of 1, 2, 3, . . . , N. Execution continues from step 137 of FIG. 11 to step 141 of FIG. 12. In step 141, if thirty data buffers 30 have been filled, then execution continues from step 141 to step 143. Execution also continues from step 142 to step 143 if the end of the file system has been reached. In step 143, the NASA thread invokes the NASW thread to begin writing to tape, and the NASA thread terminates. Otherwise, if less than 30 data buffers have been filled and the end of the file system has not been reached, then execution continues from step 143 to step 144. In step 144, the modified NASA thread is put in a wait state until another data buffer is filled or until the end of the file system has been reached. Then execution loops back to step 141 from step 144.

Figure 13:
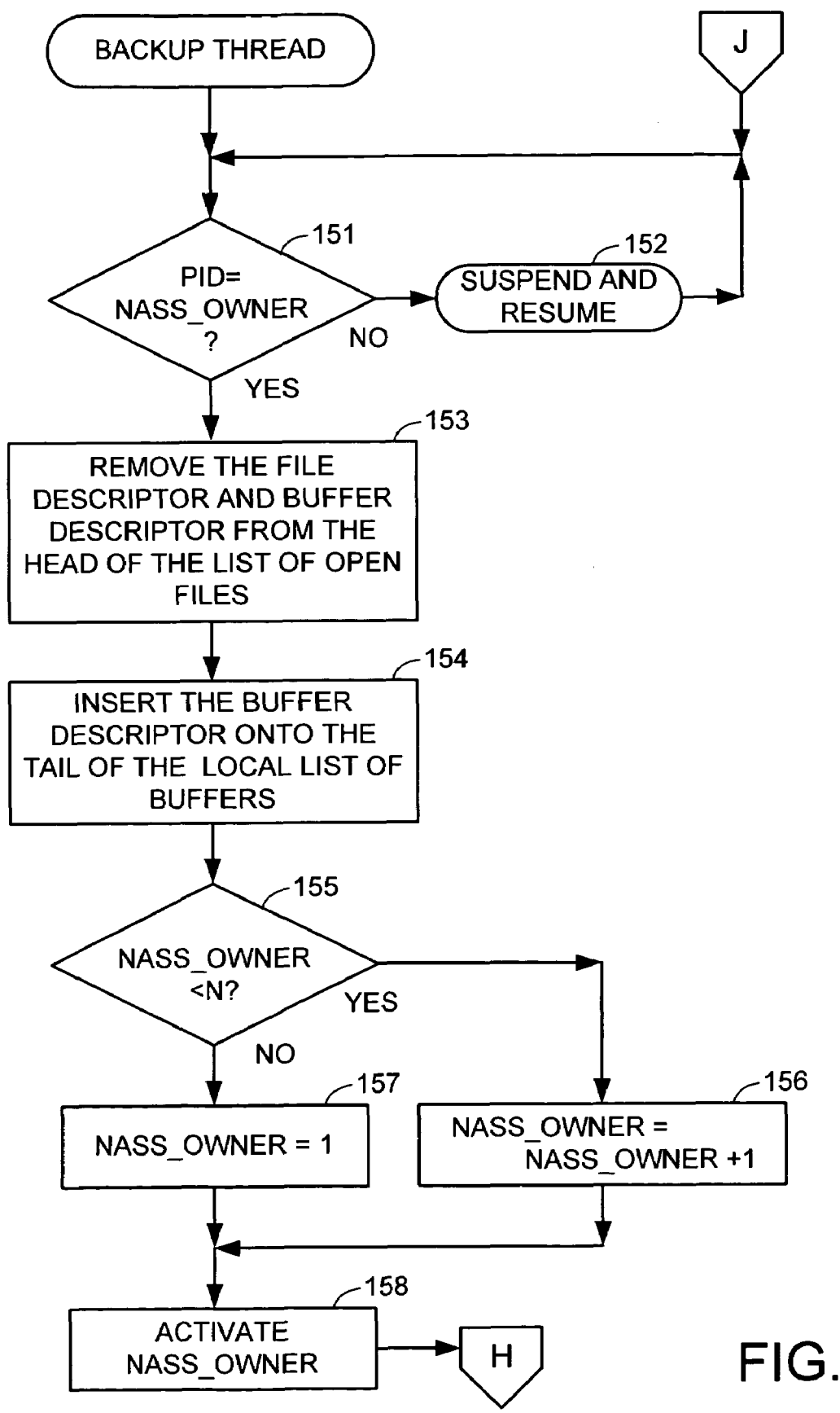
FIGS. 13–15 show a flowchart of the backup thread routine for reading files.

FIG. 13 shows the backup thread routine. In a first step 151, the backup thread checks whether its PID is the value of the nass_owner variable. If not, the backup thread is put in a wait state in step 152 until it becomes the NASS owner. Then execution continues from step 151 to step 153. In step 153, the backup thread removes the file descriptor and the buffer descriptor from the head of the list of open files. In step 154, the backup thread inserts the buffer descriptor onto the tail its local list of buffers. Then the backup thread passes NASS ownership to the next backup thread instance in the PID sequence. In particular, in step 155, if the value of nass_owner is less than N, then execution branches to step 156 to increment nass_owner by one. Otherwise, execution continues from step 155 to step 157, to set nass_owner to one. After step 156 or step 157, execution continues to step 158. In step 158, the backup thread activates the next backup thread instance, having a PID equal to the value of nass_owner. Execution continues from step 158 to step 161 in FIG. 14.

Figure 14:
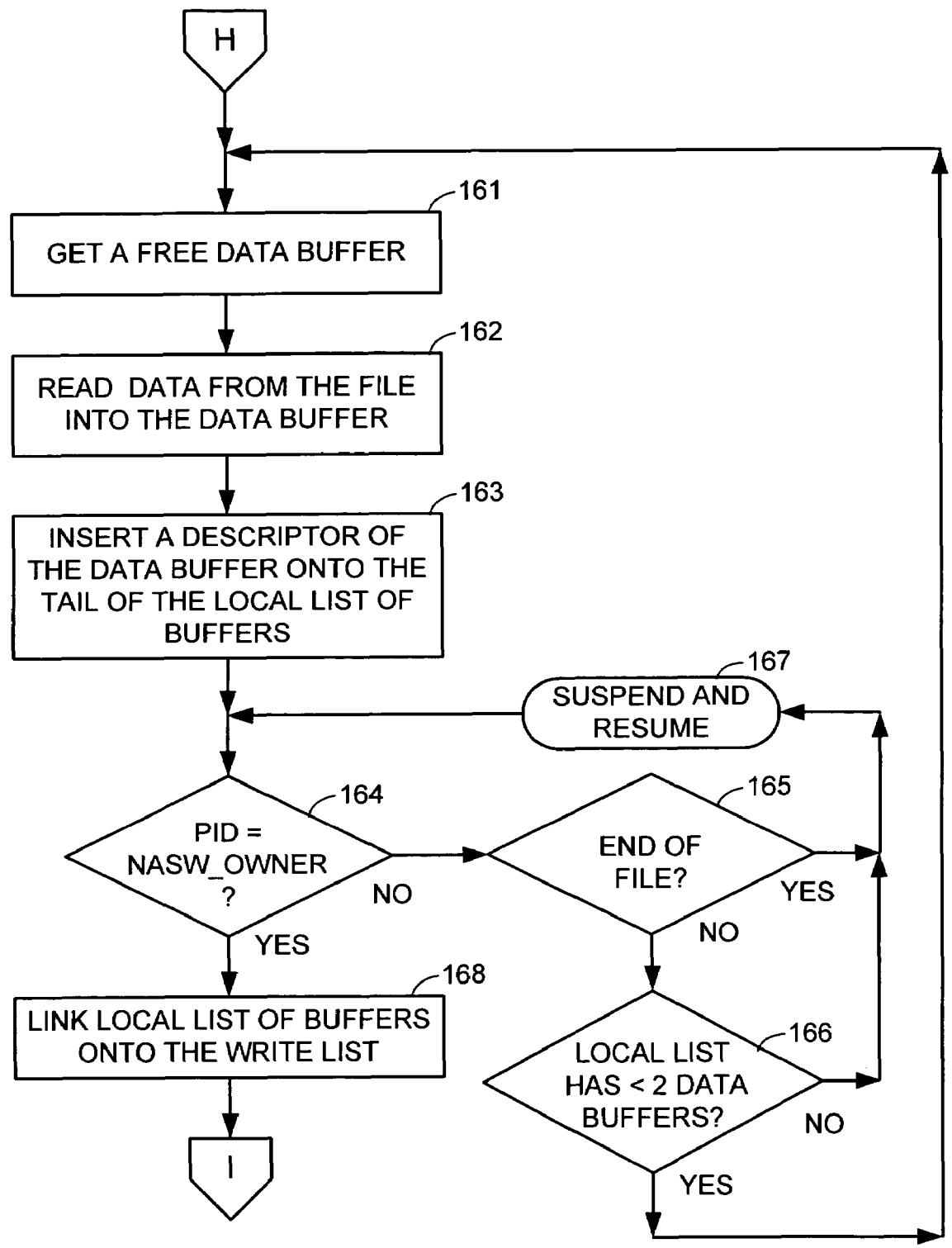

In step 161 of FIG. 14, the backup thread gets a free data buffer. In step 162, the backup thread reads data from the file into the data buffer. In step 163, the backup thread inserts a descriptor of the data buffer onto the tail of the local list of buffers.

In step 164, if the PID of the backup thread is not equal to the value of the variable nasw_owner, then execution branches to step 165. In step 165, if the end of the file has been reached, then execution continues to step 161 to put the backup thread in a wait state until the value of the variable nasw_owner becomes equal to the PID of the backup thread. In step 165, if the end of the file has not been reached, then execution continues to step 166. In step 166, if the local list for the backup thread has less than two data buffers, then execution loops back to step 161. Otherwise, execution branches from step 166 to step 167. This limits prefetching of data from the file by the backup thread to two buffers of data, before the local list of buffers is linked onto the write list. Once the value of nasw_owner becomes equal to the PID of the backup thread, execution continues from step 164 to step 168 to link the local list of buffers onto the write list. Execution continues from step 168 of FIG. 14 to step 171 of FIG. 15.

Figure 15:
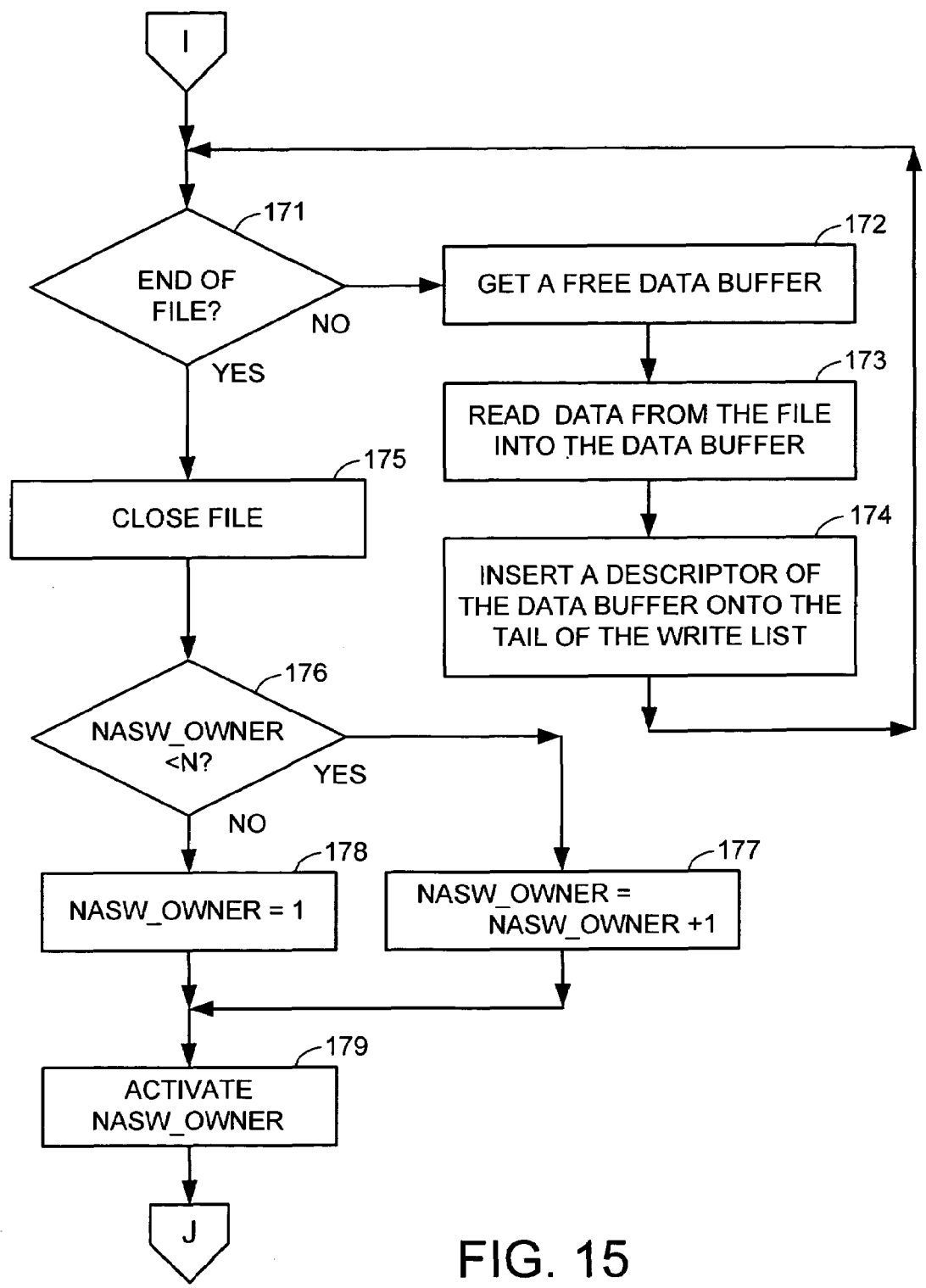

In step 171 of FIG. 15, if the end of the file has not been reached, then execution branches to step 172 to get a free data buffer in step 172, to read data from the file into the data buffer in step 173, to insert a descriptor of the data buffer onto the tail of the write list in step 174, and to loop back to step 171. Once all of the file data has been read and put into data buffers linked to the write list, execution continues from step 171 to step 175. In step 175, the backup thread closes the file.

In steps 176 to 179, the backup thread passes NASW ownership to the next backup thread instance in the PID sequence. In particular, in step 176, if the value of nasw_owner is less than N, then execution branches to step 177 to increment nasw_owner by one. Otherwise, execution continues from step 176 to step 178, to set nasw_owner to one. After step 177 or step 178, execution continues to step 179. In step 179, the backup thread activates the next backup thread instance, having a PID equal to the value of nasw_owner. Execution loops back from step 179 to step 151 in FIG. 13.

It is also desirable to use multiple concurrent instances of a thread routine for streaming data from many small files in the network file server of FIG. 1 over the IP network 25. This can be done using multiple threads similar to the threads shown in FIG. 7 except that the NASW thread is replaced with a thread for writing to a network port of the file server.

For streaming data from files in the network file server of FIG. 1 to backup tape or over an IP network, it is also possible to obtain an improvement by prefetching data blocks from disk storage to cache storage. This prefetching of data blocks to cache is particularly helpful when the file size is greater than eight kilobytes and when responding read requests from network clients.

Figure 16:
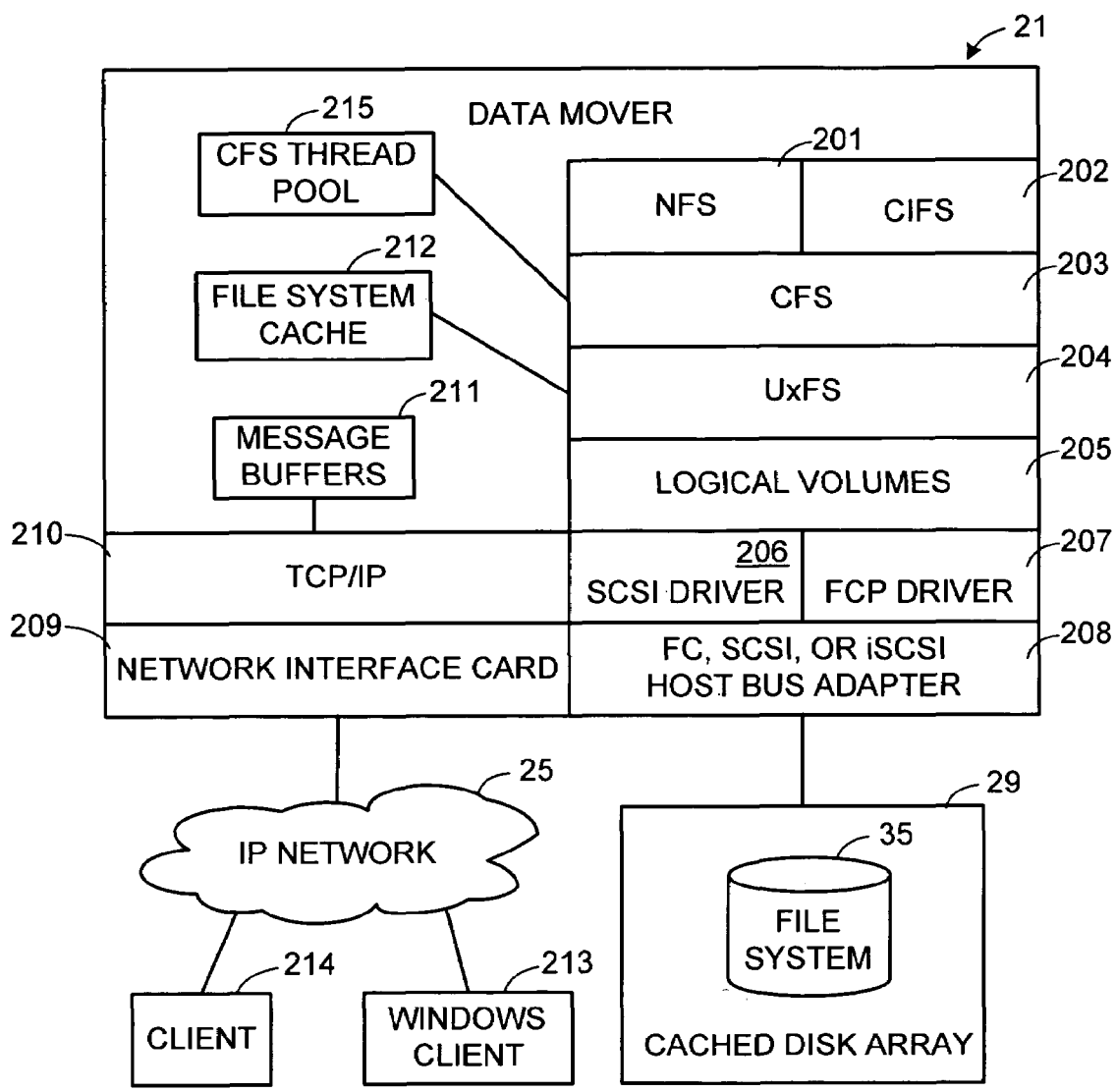
FIG. 16 shows various components of the data mover in the file server of FIG. 1.

FIG. 16, for example, shows various software modules of the data mover 21 in the network file server of FIG. 1. The data mover 21 has a Network File System (NFS) module 201 for supporting communication with the data mover over the IP network 25 using the NFS file access protocol, and a Common Internet File System (CIFS) module 202 for supporting communication with the data mover over the IP network using the CIFS file access protocol. The NFS module 201 and the CIFS module 202 are layered over a Common File System (CFS) module 203, and the CFS module is layered over a Universal File System (UxFS) module 204. The UxFS module supports a UNIX-based file system, and the CFS module 203 provides higher-level functions common to NFS and CIFS.

The UxFS module 204 accesses data organized into logical volumes defined by a module 205. Each logical volume maps to contiguous logical storage addresses in the cached disk array 29. The module 205 is layered over a SCSI driver 206 and a Fibre-channel protocol (FCP) driver 207. The data mover 21 sends storage access requests through a host bus adapter 208 using the SCSI protocol, the iSCSI protocol, or the Fibre-Channel protocol, depending on the physical link between the data mover 208 and the cached disk array 29.

A network interface card 209 in the data mover 21 receives IP data packets from the IP network 25. A TCP/IP module 210 decodes data from the IP data packets for the TCP connection and stores the data in message buffers 211. For example, the UxFS layer 204 writes data from the message buffers 211 to the file system 35 in the cached disk array 29. The UxFS layer 204 also reads data from the file system 35 or a file system cache 212 and copies the data into the message buffers 211 for transmission to the network clients 213, 214.

In an old design for the CFS layer 203, when the CFS layer was requested to read 64 kilobytes of data at offset zero from a single file, it issued eight input-output operations of eight kilobytes each, one after the other, without any prefetch. This old design is improved considerably by use of concurrent read threads in combination with prefetching. For this purpose, the data mover 21 maintains a CFS thread pool 215, further described below with reference to FIGS. 18 and 19.

Figure 17:
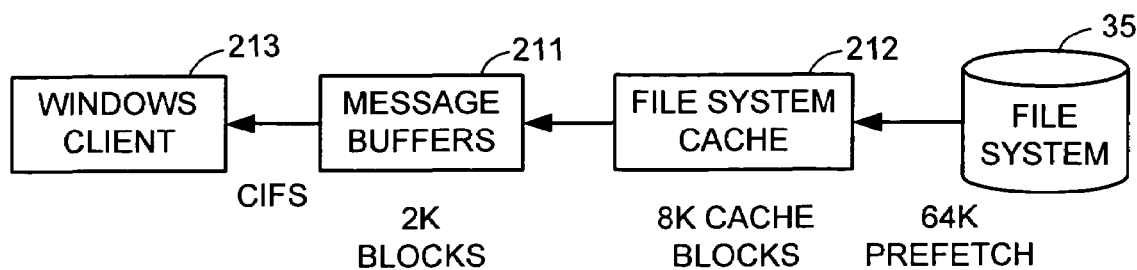
FIG. 17 shows the streaming of data from the file system to the windows client of FIG. 16.

As shown in FIG. 17, data are streamed from the file system 35 to a Windows client 213 using the CIFS file access protocol. For CIFS, the message block size is 2 kilobytes. To fill the message buffers 211 to satisfy a client request for data from a file, the data are read from the file system cache 212 if the data presently reside in the cache 212, or else the data are read from the file system 35 in the cached disk array. The data block size of the file system cache 212 is 8 kilobytes. In response to a client request, the CIFS layer looks at the request and determines how many 8K file blocks are needed to satisfy the request, and initiates a fetch operation for each 8K file block to fetch the file block from the file system 35 in the cache disk array if the file block is not already in the file system cache. The fetch operations are performed in parallel by a respective thread for fetching each 8K file block.

The CIFS layer may also respond to a client request for file data by prefetching file blocks that are not needed to satisfy the client request but that are likely to be requested in a subsequent client request. For example, if a client requests 64 kilobytes of contiguous file data aligned on the cache block boundaries, the CIFS layer fetches eight 8-kilobyte blocks of the requested file data, anticipates that the client is likely to be streaming data from the file, checks whether the file has at least 64 kilobytes of file data following the requested 64 kilobytes, and upon finding that the file has at least 64 kilobytes following the requested 64 kilobytes, prefetches an additional eight 8-kilobyte blocks of the following file data. Each additional 8-kilobyte block is prefetched by a separate respective prefetch thread that checks whether the 8-kilobyte data block resides in the file system cache 212, and if not, reads the data block from the file system 35 in the cached disk array 29, and writes the data block into the file system cache 212.

Each prefetch thread is a low priority thread relative to the fetch threads and the other threads that are needed to satisfy a client request. Therefore, any prefetch thread is executed as a background process when there otherwise would be idle processing time in the data mover.

Figure 18:
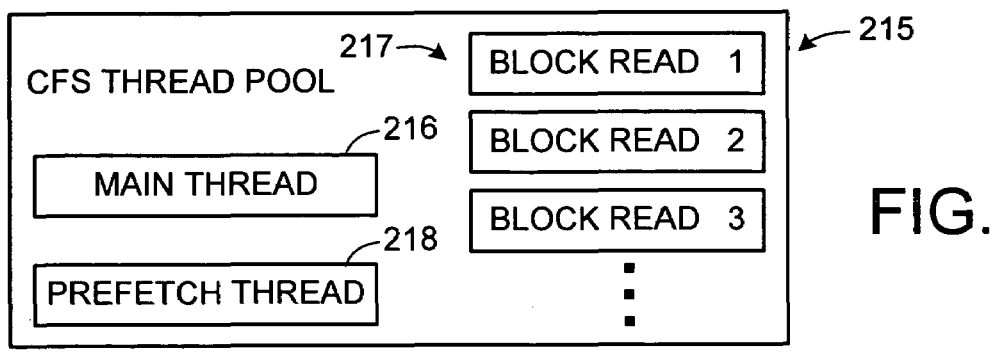
FIG. 18 shows a pool of threads for a Common File System (CFS) layer in the data mover FIG. 16.

As shown in FIG. 18, the CFS thread pool 215 includes a main thread 216, multiple block read threads 217, and a prefetch thread 218. In this preferred organization, the main thread 216 fetches one 8 kilobyte block and activates a respective one of the block read threads 217 to fetch each additional 8 kilobyte block needed to satisfy a CFS file read operation. The prefetch thread 218 prefetches one 8 kilobyte block and activates a respective one of the block read threads 217 to prefetch each additional 8 kilobyte block to be prefetched as a result of a CFS file read operation.

A thread activating one of the block read threads 217 can set a parameter of the block read thread to indicate whether the block read thread is to function as a fetch thread or a prefetch thread. A block read thread functioning as a fetch thread is given a high priority, and a block read thread functioning as a prefetch thread is given a low priority.

Figure 19:
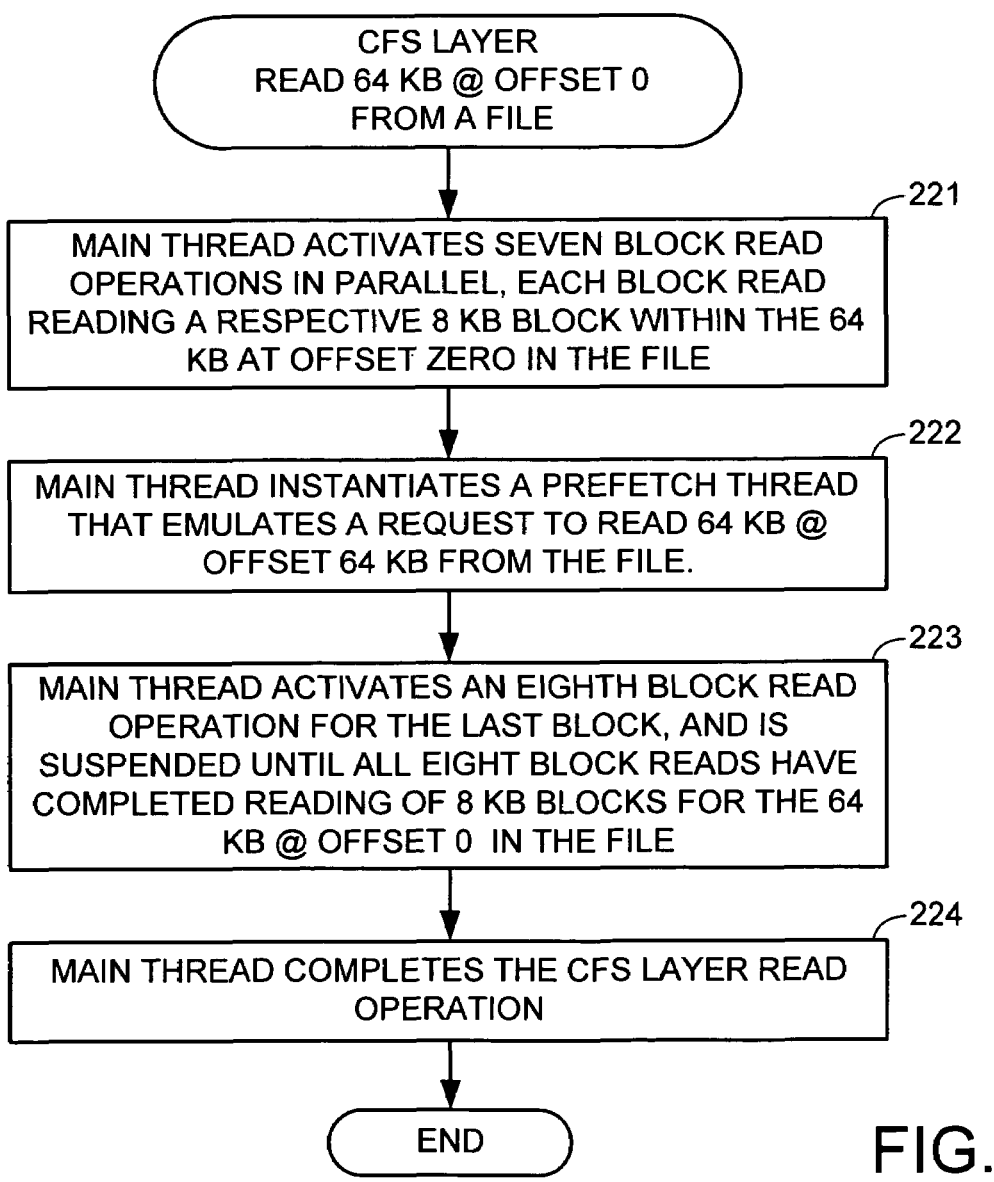
FIG. 19 is a flowchart of a CFS routine for reading 64 kilobytes at an offset of zero in a single file.

FIG. 19 shows how the CFS layer uses the threads in the CFS thread pool to respond to a request to read 64 kilobytes of data at offset zero from a single file. In a first step 221 of FIG. 19, the main thread activates seven block read operations in parallel. A respective thread performs each read operation by reading a respective eight-kilobyte block within the 64 kilobytes at offset zero in the file. For example, the main thread activates seven block read threads, one for each of the first seven eight-kilobyte blocks within the 64 kilobytes at offset zero in the file.

Next, in step 222, the main thread instantiates a prefetch thread that emulates a request to read 64 kilobytes from the file beginning at offset 64 kilobytes. Then in step 223, the main thread activates an eighth block read operation in order to read the last one of the eight blocks, and the main thread is suspended until all eight block read operations have completed the reading of their respective eight kilobyte blocks for the 64 kilobytes at offset zero in the file. Once all eight of the block read operations have been completed, in step 224 the main thread is awoken and completes the CFS layer read operation, for example, by transferring the 64 kilobytes of data from the file system cache to the message buffers. Then the main thread and the seven block read threads are returned to a waiting state in the CFS thread pool.

Figure 20:
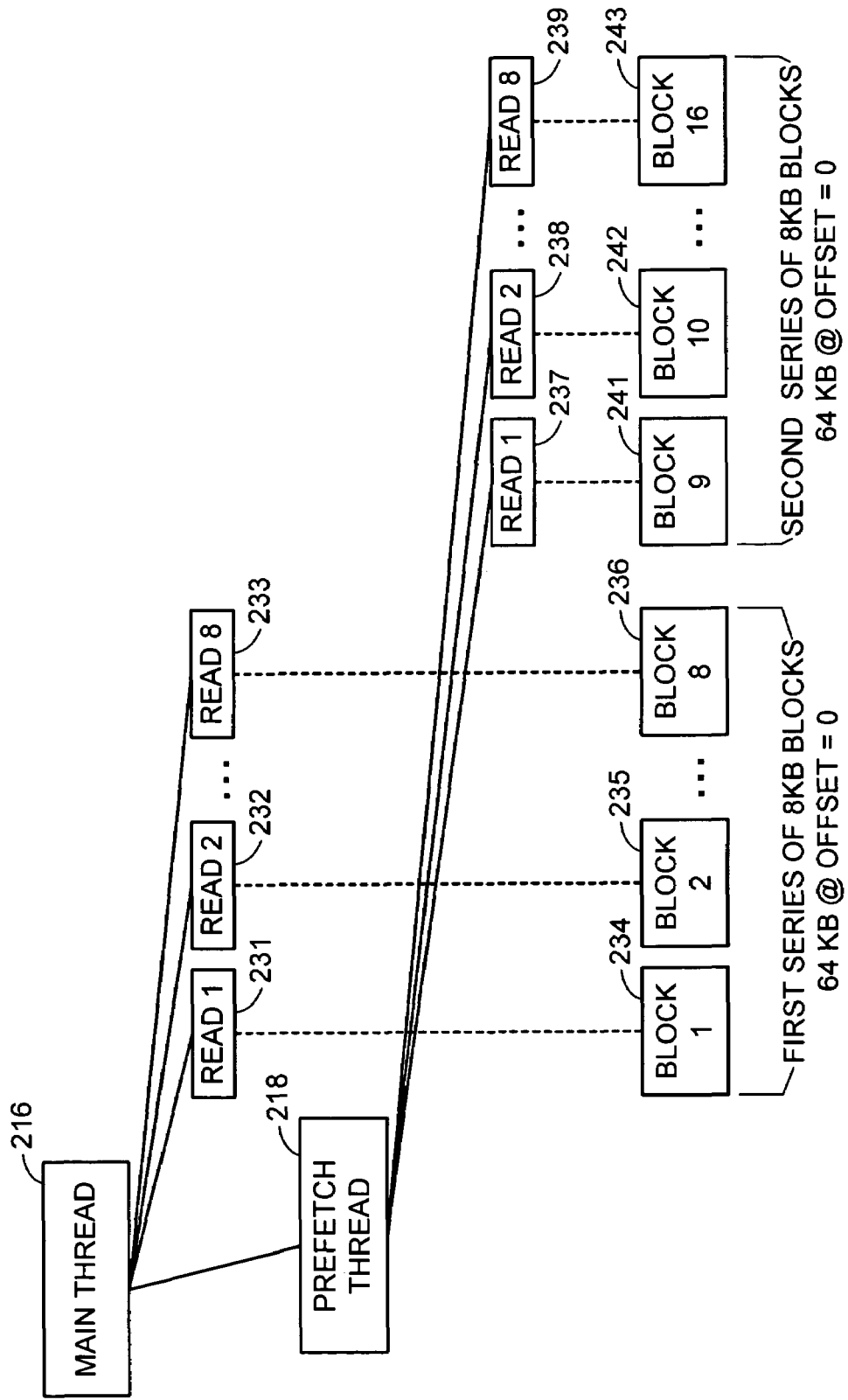
FIG. 20 is a flow diagram showing interaction between various objects during execution of the procedure of FIG. 19.

FIG. 20 shows the various objects referred to in the procedure of FIG. 19. The main thread 216 initiates eight block read operations 231, 232, 233, each reading a respective 8 KB block 234, 235, 236 in a first series of 8 KB blocks in the 64 kilobyte chunk of data at offset=0 in the file. Then the main thread 216 initiates the prefetch thread 218 that also initiates eight block read operations 237, 238, 239, each reading a respective 8 KB block 241, 242, 243 in a second series of 8 KB blocks in the 64 KB chunk of data at offset=64 KB in the file.

Figure 21:
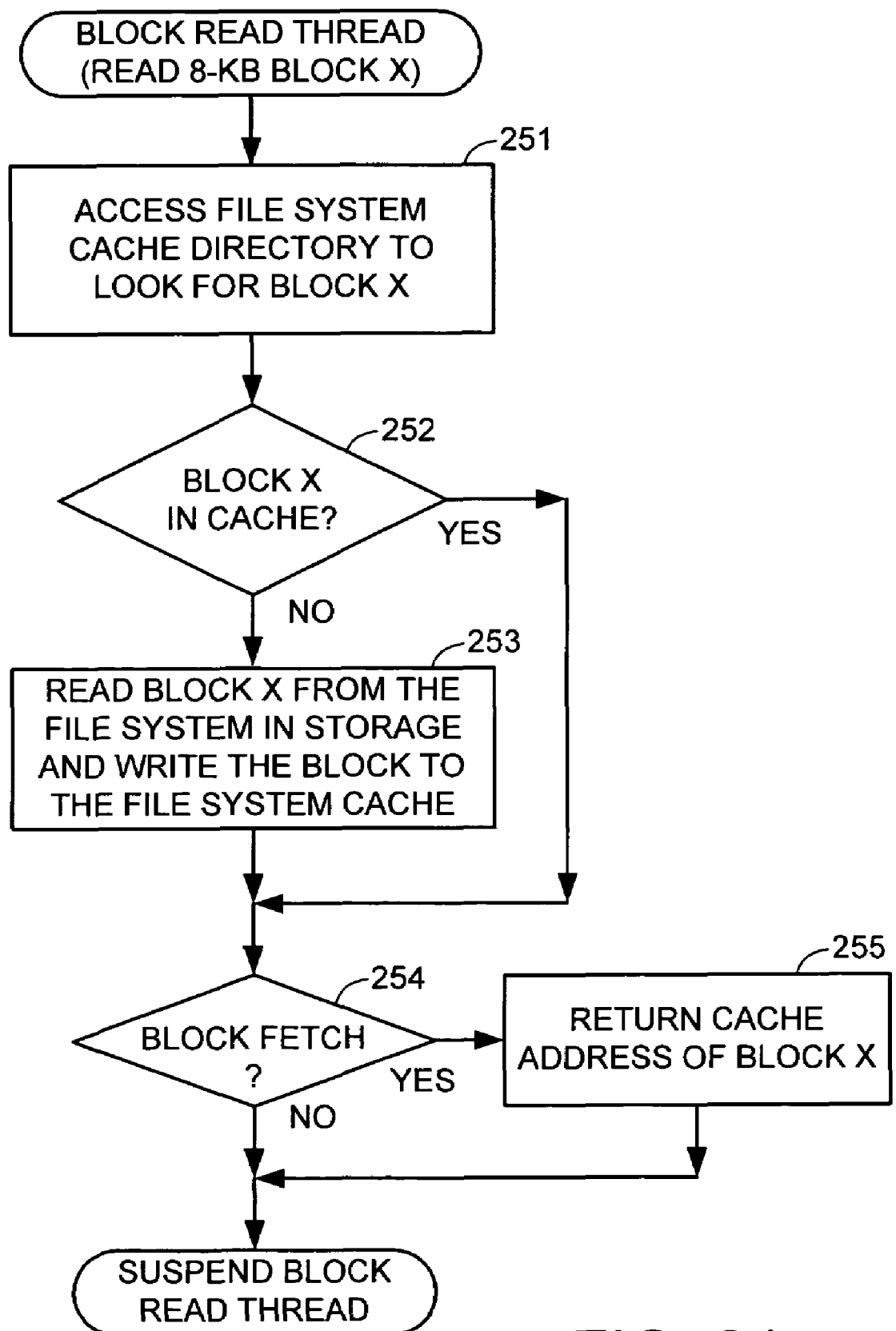
FIG. 21 is a flowchart of a block read thread used in the procedure of FIG. 19.

FIG. 21 shows the procedure for each block read thread, which reads a specified 8 KB block (referred to as block "X"). In a first step 251, the block read thread accesses the file system cache directory to look for the specified 8 KB block. If the block is not found in the file system cache, then execution continues from step 252 to step 253. In step 253, the block read thread reads the specified block from the file system in storage and writes the block to the file system cache. Execution continues from step 253 to step 254. Execution also branches to step 254 from step 252 if the specified block is found in the cache. In step 254, if the block read thread is for a fetch operation, then execution branches to step 255. In step 255, the block read thread returns the cache block address of the specified block to the process having activated the block read thread, and then the block read thread is suspended. In step 254, if the block read thread is not for a fetch operation, then the block read thread is for a prefetch operation and the block read thread is suspended. The block read thread is suspended by returning the block read thread to a waiting state in the CFS thread pool.

Figure 22:
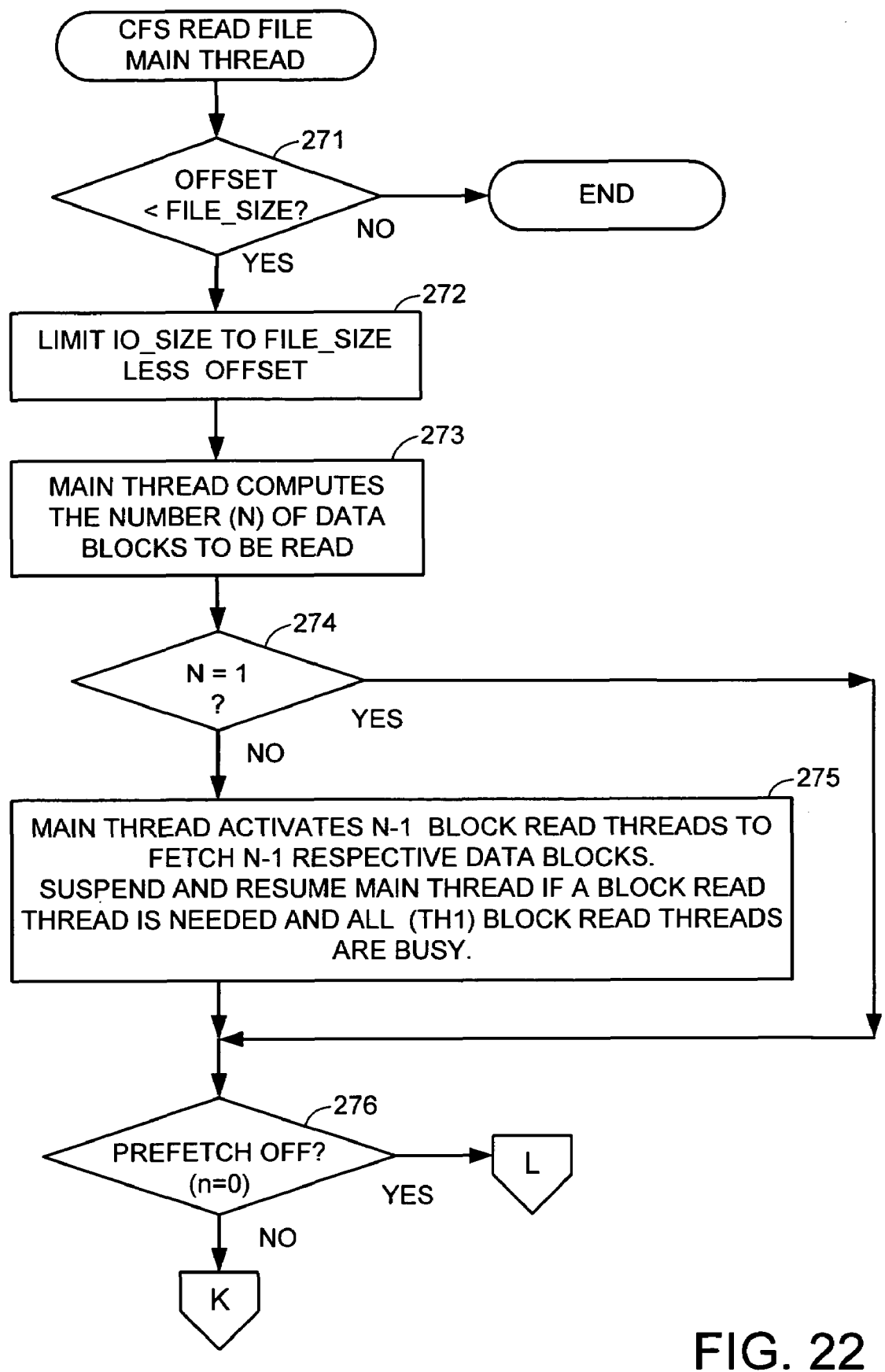
FIGS. 22 and 23 comprise a flowchart of a main thread used in the procedure of FIG. 19.

As shown in FIG. 22, the CFS main thread responds to a request to read a file by first checking the "offset" and "IO-size" specified by the read request. The offset is the logical address in the file at which the read operation is to begin, and the IO-size is the number of bytes to be read from the file, unless an "end of file" is reached before the requested number of bytes has been read. In a first step 271, the main thread compares the offset to the size of the file. If the offset is not less than the size of the file, then the main thread returns no data in response to the read request and the main thread is finished responding to the read request. Otherwise, execution continues to step 272. In step 272, the main thread limits the IO_size specified by the read request to the file size less the offset. In other words, if the IO_size specified by the read request is greater than the difference between the file size and the offset, then the IO_size is set equal to the difference between the file size and the offset.

In step 273, the main thread computes the number (N) of data blocks to be read, in order to read all of the bytes indicated by the IO_size. For example, the integer division of the offset by 8 kilobytes gives the block address of the first byte, the integer division of the sum of the offset plus the IO_size minus one by 8 kilobytes gives the block address of the last byte, and the difference between the block address of the last byte and the block address of the first byte plus one gives the number (N) of data blocks to be read.

In step 274, if the number (N) of data blocks to be read is not equal to one, then the number (N) of data blocks is greater than one, and execution continues to step 275. In step 275, the main thread activates N-1 block read threads to fetch the first N-1 blocks of the N data blocks. However, there is a limit (TH1) to the number block read threads that can be busy at any given time. For example, the default value of TH1 is 256. If the main thread needs to activate a block read thread and all of these (TH1) block read threads are busy, then the main thread is suspended and resumes once a block read thread is returned to a wait state in the CFS thread pool. Execution continues from step 275 to step 276. Execution also continues to step 276 from step 274 if the number (N) of data blocks is equal to one.

In step 276, the main thread inspects a parameter (n) that specifies a desired depth of prefetching. If the parameter (n) is equal to zero, then there will be no prefetching of data blocks by the CFS layer during a read of the file, and execution branches from step 276 to step 280 in FIG. 23. Otherwise, execution continues from step 276 to step 277 in FIG. 23 to prefetch a number of data blocks equal to the number (N) of fetched blocks multiplied by the parameter (n). Thus, in step 277, the main thread computes a "prefetch_IO_size" equal to the product (N*n*8) kilobytes, and in step 278, the main thread computes a "prefetch_offset" equal to 8 kilobytes plus the byte address of the last block (N) being fetched. In step 279, if the prefetch thread is not busy, and no more than a certain number (TH2) of block read threads will be busy prefetching, then the main thread activates the prefetch thread. The main thread passes the prefetch_IO_size and the prefetch_offset as parameters to the prefetch thread.

The number TH2 is a preselected maximum number of block read threads that can be used for prefetching at any given time. For example, the default value of TH2 is 25% of the value of TH1. Step 279 enforces this limit (TH2) by accessing a count of the number of block read threads that are presently active for prefetching, and checking whether this count plus the number (N*n) of blocks in the prefetch_IO_size exceeds the number TH2. If so, then step 279 does not activate the prefetch thread, and execution continues to step 280.

In step 280, the main thread begins a fetch of the last block of the N data blocks, or a fetch of the single block for the case where N is equal to one. In particular, the main thread accesses the file system cache directory to look for this block in the cache, and if this block is not found in the cache, then the main thread begins a read of this block from the file system in storage, and once this block is read from the file system in storage, it is written to the file system cache. Execution continues from step 280 to step 281.

In step 281, the main thread is suspended until the (N) block reads have completed. Finally, in step 282, the main thread completes the CFS layer read operation, for example, by transferring the requested data from the file system cache to the message buffers, and building a list of these message buffers.

Figure 23:
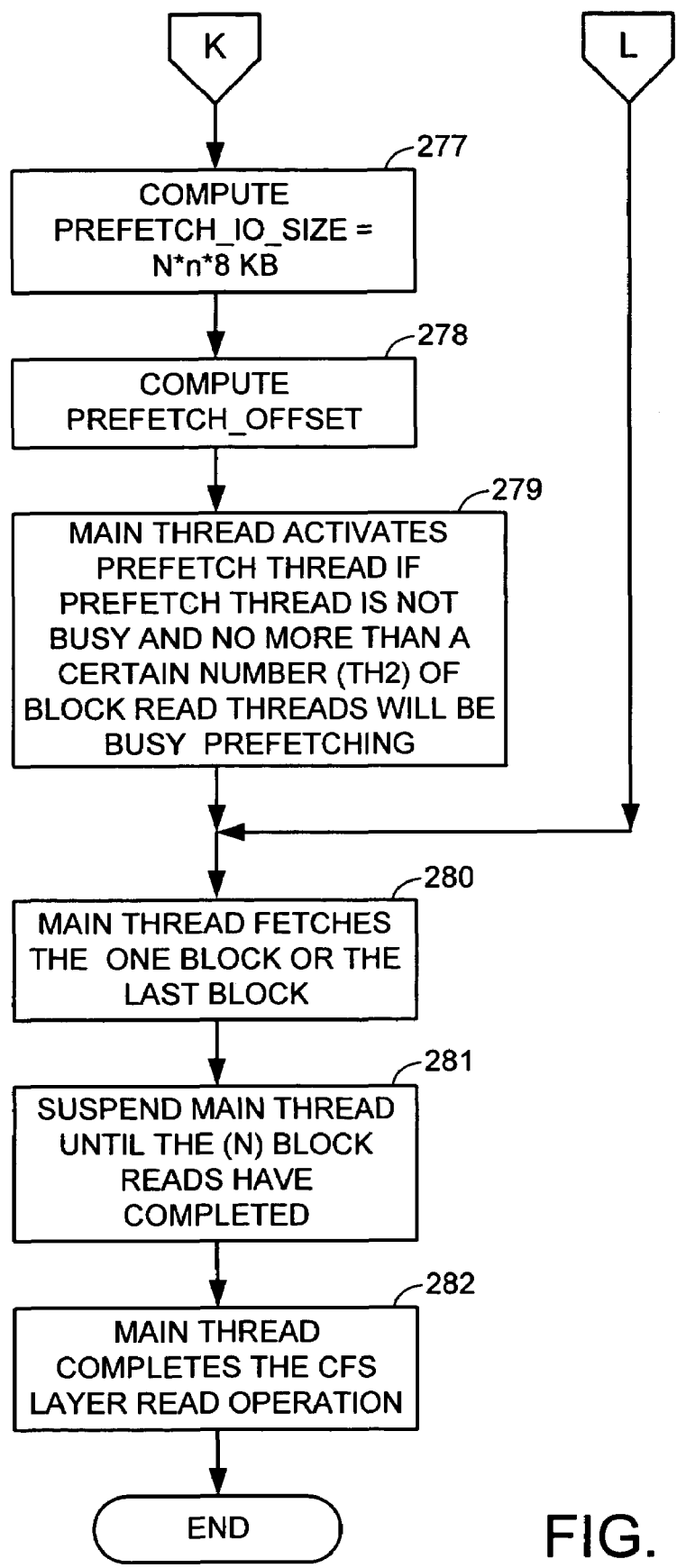
Figure 24:
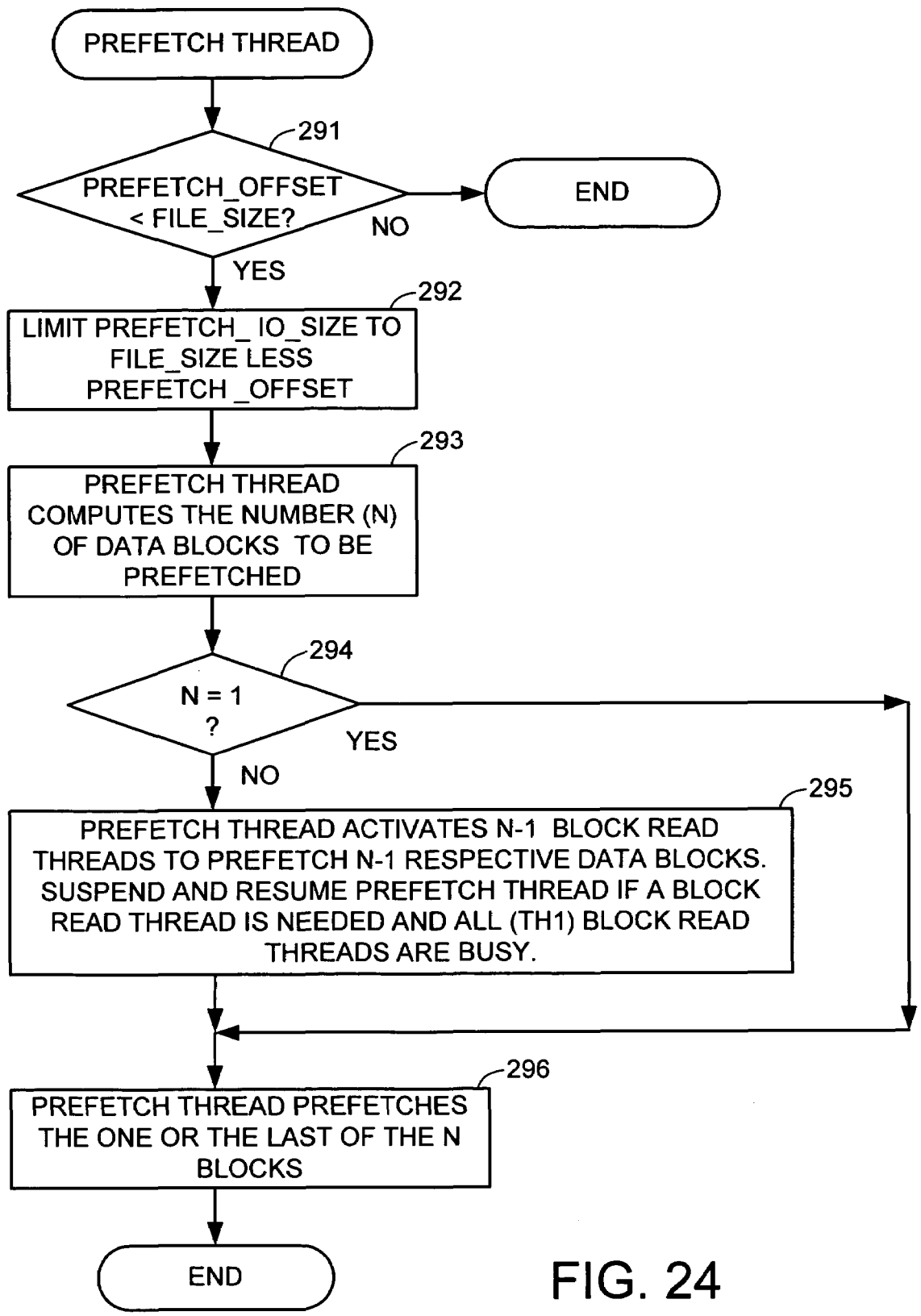
FIG. 24 is a flowchart of a prefetch thread used in the procedure of FIG. 19.

As shown in FIG. 24, the prefetch thread executes in a fashion similar to the main thread as shown in FIGS. 22 and 23, except that the prefetch thread will not start another prefetch thread, and the prefetch thread will update the file system cache without transferring the requested data to the message buffers or building a list of message buffers. In particular, in a first step 291 of FIG. 24, the prefetch thread compares the prefetch offset to the size of the file. If the prefetch offset is not less than the file size, then the prefetch thread returns no data in response to the read request and the prefetch thread is finished responding to the read request. The prefetch thread returns to a wait state in the CFS thread pool. Otherwise, execution continues to step 292. In step 292, the prefetch thread limits the prefetch IO_size to the file size less the prefetch offset.

In step 293, the prefetch thread computes the number (N) of data blocks to be prefetched. For example, the integer division of the prefetch_offset by 8 kilobytes gives the block address of the first byte to be prefetched, the integer division of the sum of the prefetch_offset plus the prefetch_IO_size minus one by 8 kilobytes gives the block address of the last byte to be prefetched, and the difference between the block address of the last byte and the block address of the first byte plus one gives the number (N) of data blocks to be prefetched. In step 294, if the number of data blocks to be prefetched is equal to one, then execution branches to step 295. Otherwise, in step 294, if the number (N) of data blocks to be prefetched is not equal to one, then the number (N) is greater than one, and execution continues to step 295.

In step 295, the prefetch thread activates N−1 block read threads to prefetch the first N−1 blocks of the N data blocks. The prefetch thread is suspended and resumes if a block tread thread is needed ant all (TH1) of the block read threads are busy. Execution continues from step 295 to step 296.

In step 296, the prefetch thread prefetches the last block of the N data blocks, or for the case of N=1, the single block, for example, by accessing the file system cache directory to look for this block, and if this block is not in the file system cache, then reading this block from the file system in storage and writing this block to the file system cache. Then the prefetch thread is finished responding to the prefetch request, and it returns to a wait state in the CFS thread pool.

It is possible to provide multiple main threads that share the block read threads in the CFS thread pool. For example, there could be one main thread for handling file read requests from CIFS, and another main thread for handling file read requests from NFS. In addition, the NASA thread may be programmed as a main thread that reads blocks of file data in a fashion similar to the main thread shown in FIGS. 22 and 23. Each of these main threads may have a respective prefetch thread. These main threads and their respective prefetch threads may share the block read threads.

Although each instance of a thread routine can be created, scheduled, prioritized, and terminated using conventional operating system routines, it should be appreciated that instances of a thread routine can also be created, scheduled, prioritized, and terminated using machine language instructions and appropriate processor stack manipulations. For example, in its most elementary form, a multi-tasking operating system is nothing more than a thread handler routine that services a periodic timer interrupt of a processor. In response to a timer interrupt, the processing of a current thread is interrupted by pushing the contents of the processor registers onto the processor stack, and then beginning execution of the thread handler routine. The thread handler routine maintains a queue of threads and a record of the processor register state, status (e.g., active, suspended, waiting on condition) and priority level of each thread. The thread handler decides what thread should next be executed, and if it decides that execution should be passed to some thread other than the interrupted thread, the thread handler removes the state of the interrupted thread from the stack and saves the state of the interrupted thread, and pushes the processor register state of the next thread to be executed upon the stack. Then the thread handler executes a "return from interrupt" machine instruction to resume execution of either the interrupted thread or the next thread to be executed.

In view of the above, a problem of latency during the read of a file is solved by doing multiple reads of file blocks in parallel as well as prefetching file blocks from storage to the file system cache. Prefetching ensures that by the time that a client or application needs more file data, the file data will already have been read from storage and written to the file system cache as a background operation. In other words, the prefetch task is outside of the critical path for immediate response to application or client requests.

What is claimed is:

1. In a file server having a cache memory and storage containing a file, a method of responding to a request for reading an extent of data from the file, the extent of data spanning a first series of multiple blocks of file data, the file also spanning a second series of multiple blocks of file data following the first series of multiple blocks of file data, the method comprising:

(a) activating a respective read thread for reading each of the multiple blocks of file data in the first series of multiple blocks of file data so that the read threads are concurrently reading the multiple blocks of file data in the first series of multiple blocks of file data; and (b) prefetching the second series of multiple blocks of file data by reading from the storage and writing to the cache memory each block of file data in the second series of multiple blocks of file data that is not found in the cache memory.

2. The method as claimed in claim 1, wherein one of the read threads is a main thread executed in response to the request for reading the extent of data from the file, and wherein the main thread reads one of the blocks of file data in the first series of multiple blocks of file data, and the main thread activates the other read threads for reading the other blocks of file data in the first series of multiple blocks of file data.

3. The method as claimed in claim 2, wherein the main thread activates a prefetch thread for prefetching the second series of multiple blocks of file data.

4. The method as claimed in claim 3, which includes the prefetch thread activating read threads for prefetching at least some of the blocks of file data in the second series of multiple blocks of file data.

5. The method as claimed in claim 2, which includes suspending the main thread until completion of the reading of all of the blocks of file data in the first series of multiple blocks of file data.

6. The method as claimed in claim 1, which includes executing a main thread for responding to the request for reading the extent of data from the file, the main thread activating a number of the read threads for reading at least some of the blocks of file data in the first series of multiple blocks of file data, and the main thread activating a prefetch thread for prefetching the second series of multiple blocks of file data.

7. The method as claimed in claim 6, which includes suspending the main thread after the main thread activates the prefetch thread, and activating the suspended main thread once said number of the read threads have finished reading said at least some of the blocks of file data in the first series of multiple blocks of file data.

8. The method as claimed in claim 6, which includes the prefetch thread activating read threads for prefetching at least some of the blocks of file data in the second series of multiple blocks of file data.

9. The method as claimed in claim 1, wherein the blocks of file data have a block size of eight kilobytes, and the first series of multiple blocks of file data consists of eight blocks of file data, and the second series of multiple blocks of file data consists of eight blocks of file data.

10. The method as claimed in claim 1, wherein the request for reading the extent of data is from a client or application of the file server, and by the time that the client or application of the file server needs more data of the file, the prefetching has already read said more data of the file from the storage and has written said more data of the file to the cache memory, whereby said more data of the file is more readily available to the client or application of the file server.

11. In a file server having a cache memory and storage containing a file, a method of responding to a request for reading an extent of data from the file, the extent of data spanning a first series of multiple blocks of file data, the file also spanning a second series of multiple blocks of file data following the first series of multiple blocks of file data, the method comprising:

executing a main thread for responding to the request for reading the extent of data from the file, the main thread activating block read threads for reading at least some of the blocks of file data in the first series of multiple blocks of file data so that the block read threads are concurrently reading said at least some of the blocks of file data in the first series of multiple blocks of file data, and then the main thread activating a prefetch thread for prefetching the second series of multiple blocks of file data by reading from the storage and writing to the cache memory each block of file data in the second series of multiple blocks of file data that is not found in the cache memory; and then suspending the main thread, and then activating the main thread once the block read threads have finished reading said at least some of the blocks of file data in the first series of multiple blocks of file data.

12. The method as claimed in claim 11, wherein the main thread reads one of the blocks of file data in the first series of multiple blocks of file data, and the block read threads activated by the main thread read the other blocks of file data in the first series of multiple blocks of file data.

13. The method as claimed in claim 11, which includes the prefetch thread activating block read threads for prefetching at least some of the blocks of file data in the second series of multiple blocks of file data.

14. The method as claimed in claim 13, wherein the main thread and the prefetch thread share a pool of block read threads.

15. The method as claimed in claim 11, wherein the blocks of file data have a block size of eight kilobytes, and the first series of multiple blocks of file data consists of eight blocks of file data, and the second series of multiple blocks of file data consists of eight blocks of file data.

16. The method as claimed in claim 11, wherein the request for reading the extent of data is from a client or application of the file server, and when the client or application of the file server needs to read more data of the file, the prefetching has already read said more data of the file from the storage and has written said more data of the file to the cache memory, whereby said more data of the file is more readily available to the client or application of the file server.

17. In a file server having a file system cache memory and storage containing a file, a method of responding to a request for reading an extent of data from the file, the extent of data including a first series of multiple blocks of file data, the file including a second series of multiple blocks of file data immediately following the first series of multiple blocks of file data, the method comprising:

activating concurrent read operations, each of the concurrent read operations reading a respective one of the multiple blocks of file data, and prefetching from the storage to the file system cache memory the second series of multiple blocks of file data immediately following the first series of multiple blocks of file data.

18. The method as claimed in claim 17, which includes executing a main thread for responding to the request for reading the extent of data from the file, the main thread performing one of the concurrent read operations, and the main thread activating block read threads for performing the other concurrent read operations.

19. The method as claimed in claim 18, wherein the main thread activates a prefetch thread for prefetching from the storage to the file system cache memory the second series of multiple blocks of file data.

20. The method as claimed in claim 17, wherein the prefetch thread prefetches one of the blocks in the second series of multiple blocks of file data, and the prefetch thread activates block read threads for prefetching the other blocks in the second series of multiple blocks of file data.

21. The method as claimed in claim 17, which includes executing a main thread for responding to the request for reading the extent of data from the file, the main thread activating block read threads for performing at least some of the concurrent read operations, and the main thread activating a prefetch thread for prefetching from the storage to the file system cache memory the second series of multiple blocks of file data immediately following the first series of multiple blocks of file data.

22. The method as claimed in claim 21, which includes suspending the main thread after the main thread activates the prefetch thread, and activating the suspended main thread once the block read threads have finished said at least some of the concurrent read operations.

23. The method as claimed in claim 17, wherein the request for reading the extent of data is from a client or application of the file server, and when the client or application of the file server needs to read more data of the file, the prefetching has already read said more data of the file from the storage and has written said more data of the file to the cache memory, whereby said more data of the file is more readily available to the client or application of the file server.

24. A file server comprising a cache memory and storage containing a file, the file server being programmed for responding to a request for reading an extent of data from the file, the extent of data spanning a first series of multiple blocks of file data, the file also spanning a second series of multiple blocks of file data following the first series of multiple blocks of file data, the file server being programmed for responding to the request for reading the extent of data from the file by:

(a) activating a respective read thread for reading each of the multiple blocks of file data in the first series of multiple blocks of file data so that the read threads are concurrently reading the multiple blocks of file data in the first series of multiple blocks of file data; and (b) prefetching the second series of multiple blocks of file data by reading from the storage and writing to the cache memory each block of file data in the second series of multiple blocks of file data that is not found in the cache memory.

25. The file server as claimed in claim 24, wherein one of the read threads is a main thread executed in response to the request for reading the extent of data from the file, and wherein the main thread is programmed for reading one of the blocks of file data in the first series of multiple blocks of file data, and for activating the other read threads for reading the other blocks of file data in the first series of multiple blocks of file data.

26. The file server as claimed in claim 25, wherein the main thread is programmed for activating a prefetch thread for prefetching the second series of multiple blocks of file data.

27. The file server as claimed in claim 26, wherein the prefetch thread is programmed for activating read threads for prefetching at least some of the blocks of file data in the second series of multiple blocks of file data.

28. The file server as claimed in claim 25, which is programmed for suspending the main thread until completion of the reading of all of the blocks of file data in the first series of multiple blocks of file data.

29. The file server as claimed in claim 24, which is programmed for executing a main thread for responding to the request for reading the extent of data from the file, and the main thread is programmed for activating a number of the read threads for reading at least some of the blocks of file data in the first series of multiple blocks of file data, and for activating a prefetch thread for prefetching the second series of multiple blocks of file data.

30. The file server as claimed in claim 29, which is programmed for suspending the main thread after the main thread activates the prefetch thread, and for activating the suspended main thread once said number of the read threads have finished reading said at least some of the blocks of file data in the first series of multiple blocks of file data.

31. The file server as claimed in claim 29, wherein the prefetch thread is programmed for activating read threads for prefetching at least some of the blocks of file data in the second series of multiple blocks of file data.

32. The file server as claimed in claim 24, wherein the blocks of file data have a block size of eight kilobytes, and the first series of multiple blocks of file data consists of eight blocks of file data, and the second series of multiple blocks of file data consists of eight blocks of file data.

33. The file server as claimed in claim 24, wherein the file server is capable of responding to the request for reading the extent of data from a client or application of the file server so that when the client or application of the file server needs to read more data of the file, the prefetching has already read said more data of the file from the storage and has written said more data of the file to the cache memory, whereby said more data of the file is more readily available to the client or application of the file server.

34. A file server comprising a cache memory and storage containing a file, the file server being programmed for responding to a request for reading an extent of data from the file, the extent of data spanning a first series of multiple blocks of file data, the file also spanning a second series of multiple blocks of file data following the first series of multiple blocks of file data, the file server being programmed for responding to the request for reading the extent of data from the file by executing a main thread for responding to the request for reading the extent of data from the file, the main thread being programmed for activating block read threads for reading at least some of the blocks of file data in the first series of multiple blocks of file data so that the block read threads are concurrently reading said at least some of the blocks of file data in the first series of multiple blocks of file data, and then activating a prefetch thread for prefetching the second series of multiple blocks of file data, the prefetching of the second series of multiple blocks of file data reading from the storage and writing to the cache memory each block of file data in the second series of multiple blocks of file data that is not found in the cache memory, and then suspending the main thread, and then activating the main thread once the block read threads have finished reading the number of blocks of file data in the first series of multiple blocks of file data.

35. The file server as claimed in claim 34, wherein the main thread is programmed for reading one of the blocks of file data in the first series of multiple blocks of file data, and wherein the block read threads activated by the main thread are programmed for reading the other blocks of file data in the first series of multiple blocks of file data.

36. The file server as claimed in claim 34, wherein the prefetch thread is programmed for activating block read threads for prefetching at least some of the blocks of file data in the second series of multiple blocks of file data.

37. The file server as claimed in claim 36, wherein the main thread and the prefetch thread share a pool of block read threads.

38. The file server as claimed in claim 34, wherein the blocks of file data have a block size of eight kilobytes, and the first series of multiple blocks of file data consists of eight blocks of file data, and the second series of multiple blocks of file data consists of eight blocks of file data.

39. The file server as claimed in claim 34, wherein the file server is capable of responding to the request for reading the extent of data from a client or application of the file server so that when the client or application of the file server needs more data of the file, the prefetching has already read said more data of the file from the storage and has written said more data of the file to the cache memory, whereby said more data of the file is more readily available to the client or application of the file server.

40. A file server comprising a file system cache memory and storage containing a file, the file server being programmed for responding to a request for reading an extent of data from the file, the extent of data spanning a first series of multiple blocks of file data, the file also spanning a second series of multiple blocks of file data following the first series of multiple blocks of file data, the file server being programmed for responding to the request for reading the extent of data from the file by activating concurrent read operations, each of the concurrent read operations reading a respective one of the multiple blocks of file data, and prefetching from the storage to the file system cache memory a second series of multiple blocks of file data immediately following the first series of multiple blocks of file data.

41. The file server as claimed in claim 40, which is programmed for executing a main thread for responding to the request for reading the extent of data from the file, and wherein the main thread is programmed for performing one of the concurrent read operations, and activating block read threads for performing the other concurrent read operations.

42. The file server as claimed in claim 41, wherein the main thread is programmed for activating a prefetch thread for prefetching from the storage to the file system cache memory the second series of multiple blocks of file data.

43. The file server as claimed in claim 42, wherein the prefetch thread is programmed for prefetching one of the blocks in the second series of multiple blocks of file data, and for activating block read threads for prefetching the other blocks in the second series of multiple blocks of file data.

44. The file server as claimed in claim 40, which is programmed for executing a main thread for responding to the request for reading the extent of data from the file, the main thread being programmed for activating block read threads for performing at least some of the concurrent read operations, and the main thread is programmed for activating a prefetch thread for prefetching from the storage to the file system cache memory the second series of multiple blocks of file data immediately following the first series of multiple blocks of file data.

45. The file server as claimed in claim 44, which is programmed for suspending the main thread after the main thread activates the prefetch thread, and activating the suspended main thread once the block read threads have finished said at least some of the concurrent read operations.

46. The file server as claimed in claim 40, wherein the file server is capable of responding to the request for reading the extent of data from a client or application of the file server so that when the client or application of the file server needs more data of the file, the prefetching has already read said more data of the file from the storage and has written said more data of the file to the cache memory, whereby said more data of the file is more readily available to the client or application of the file server.

* * * * *